United States Patent
Sasaki et al.

(10) Patent No.: US 11,261,650 B2
(45) Date of Patent: Mar. 1, 2022

(54) AUTOMATIC DOOR SENSOR, AUTOMATIC DOOR SYSTEM, AND METHOD OF CONTROLLING AUTOMATIC DOOR SYSTEM

(71) Applicant: NABTESCO CORPORATION, Tokyo (JP)

(72) Inventors: Shigeaki Sasaki, Kobe (JP); Hisayuki Kanki, Kobe (JP); Yasutaka Kanda, Kobe (JP)

(73) Assignee: NABTESCO CORPORATION, Tokyo (JP)

( * ) Notice: Subject to any disclaimer, the term of this patent is extended or adjusted under 35 U.S.C. 154(b) by 105 days.

(21) Appl. No.: 16/483,191

(22) PCT Filed: Feb. 5, 2018

(86) PCT No.: PCT/JP2018/003724
§ 371 (c)(1),
(2) Date: Aug. 2, 2019

(87) PCT Pub. No.: WO2018/143448
PCT Pub. Date: Aug. 9, 2018

(65) Prior Publication Data
US 2019/0360256 A1  Nov. 28, 2019

(30) Foreign Application Priority Data

Feb. 3, 2017 (JP) .............................. JP2017-019015
Feb. 3, 2017 (JP) .............................. JP2017-019018
Feb. 2, 2018 (JP) .............................. JP2018-017250

(51) Int. Cl.
*G05B 15/02* (2006.01)
*E05F 15/73* (2015.01)

(52) U.S. Cl.
CPC .............. *E05F 15/73* (2015.01); *G05B 15/02* (2013.01); *E05F 2015/765* (2015.01); *E05Y 2900/132* (2013.01); *G05B 2219/40062* (2013.01)

(58) Field of Classification Search
CPC .... E05F 15/73; E05F 2015/765; G05B 15/02; G05B 2219/40062; E05Y 2900/132
See application file for complete search history.

(56) References Cited

U.S. PATENT DOCUMENTS

2002/0157314 A1* 10/2002 Takada .................... E05F 15/74
49/26
2004/0160318 A1* 8/2004 Sasaki .................... E05F 15/43
340/522

(Continued)

FOREIGN PATENT DOCUMENTS

CN      1832184 A     9/2006
JP      8-136654 A    5/1996

(Continued)

OTHER PUBLICATIONS

International Preliminary Report on Patentability dated Aug. 6, 2019 issued in corresponding International Patent Application No. PCT/JP2018/003724.

(Continued)

*Primary Examiner* — Christopher E. Everett
(74) *Attorney, Agent, or Firm* — Pillsbury Winthrop Shaw Pittman, LLP

(57) ABSTRACT

A special detection area in which detection in accordance with an activation detection algorithm for detecting a person or an object and detection in accordance with a protection detection algorithm having a higher detection sensitivity for the person or the object than the activation detection algorithm are performed is provided. Results of the detections in (Continued)

accordance with the activation detection algorithm and the protection detection algorithm are individually output to an automatic door device.

12 Claims, 34 Drawing Sheets

(56) References Cited

U.S. PATENT DOCUMENTS

| | | | |
|---|---|---|---|
| 2006/0187037 A1* | 8/2006 | Eubelen | E05F 15/73 340/552 |
| 2015/0059248 A1* | 3/2015 | Iwata | E05F 15/40 49/26 |

FOREIGN PATENT DOCUMENTS

| | | |
|---|---|---|
| JP | 2002-276243 A | 9/2002 |
| JP | 2003-003750 A | 1/2003 |
| JP | 2005-036578 A | 2/2005 |
| JP | 2008-291598 A | 12/2008 |

OTHER PUBLICATIONS

International Search Report PCT/JP2018/003724 dated Apr. 10, 2018 with English translation.
Third Office Action dated Aug. 4, 2021, issued in corresponding Chinese Patent Application No. 201880010088.1 with English translation (14 pgs.).
Notification of Reason for Rejection dated Sep. 3, 2021, issued in corresponding Japanese Patent Application No. 2018-017250 with English translation (7 pgs.).

\* cited by examiner

|  | Stationary Object Detection Time | First Mode | Second Mode | Third Mode |
|---|---|---|---|---|
| Activation Detection Algorithm | Short | Yes | Yes | Yes |
| Protection Detection Algorithm | Long | No | No | No |

Fig. 15

AUTOMATIC DOOR SENSOR, AUTOMATIC DOOR SYSTEM, AND METHOD OF CONTROLLING AUTOMATIC DOOR SYSTEM

CROSS-REFERENCE TO RELATED APPLICATIONS

This Application is the U.S. National Stage of PCT/JP2018/003724, filed Feb. 5, 2018, which claims priority to Japanese Patent Application No. 2017-019015, filed Feb. 3, 2017, Japanese Patent Application No. 2017-019018, filed Feb. 3, 2017, and Japanese Patent Application No. 2018-017250 filed Feb. 2, 2018. The contents of each of which is incorporated herein by reference in its entirety.

TECHNICAL FIELD

The present invention relates to an automatic door sensor, an automatic door system, and a method of controlling an automatic door system.

BACKGROUND

Automatic door sensors used for automatic doors are required to have appropriate detection areas in order to ensure safety. Various techniques for setting a detection area of an automatic door sensor have been proposed. For example, Japanese Patent Application Publication No. 2003-3750 describes a technique for improving the safety of a doorway by setting the detection area on the doorway.

SUMMARY

A detection means (predetermined sensor or detection algorithm) appropriate for a target detection area of the automatic door sensor has been used for detection by the automatic door sensor. Specifically, for an automatic door sensor that performs detection in an activation area where a person approaching is detected to open the door, a detection means for opening the door while reducing the frequency of unnecessary opening and closing operations of the door has been used. Whereas for an automatic door sensor that performs detection in a protection area such as a doorway to protect a person approaching, a detection means for monitoring the person standing by the door and the like has been used.

However, when a single automatic door sensor detects both the protection area and the activation area, a part of the protection area must be used as the activation area. In this case, the detection means used to detect the protection area will be also used to detect the activation area. When the detection means for detecting the protection area is used to detect the activation area, false detections may easily occur due to effects of the automatic door and its installation environment, which results in a increased frequency of unnecessary opening and closing operations of the door.

The invention has been made in consideration of the above drawback, and one object of the invention is to provide an automatic door sensor that can achieve both reduction of frequency of unnecessary door opening and closing and improvement in safety of the door. The invention also provides an automatic door system, and a control method of the automatic door system thereof.

According to a first aspect of the invention, provided is an automatic door sensor that includes an activation detection means detecting a person or an object, and a protection detection means having a higher detection sensitivity for the person or the object than the activation detection means. The automatic door sensor has a special detection area in which detections by the activation detection means and the protection detection means are performed and the automatic door sensor is capable of outputting results of the detections individually.

In the automatic door sensor, the automatic door sensor may further have an activation detection area in which detection is performed only by the activation detection means, and the special detection area may be disposed closer to a door than the activation detection area.

The automatic door sensor may further include a doorway detection means detecting a person or an object on a track of the door. The automatic door sensor may have a second special detection area in which detections by the doorway detection means and the protection detection means are performed and may output results of the detections individually or collectively.

In the automatic door sensor, the detection by the protection detection means in the second special detection area may be performed only when the door is in a fully-opened position.

The automatic door sensor may further include a fixed-wall side detection means detecting a person or an object in the vicinity of a fixed wall of the door. The automatic door sensor may have a third special detection area in which detections by the fixed-wall side detection means and the protection detection means are performed and outputs results of the detections individually or collectively.

In the automatic door sensor, in the detection by the protection detection means, a stationary object detection time, which is time from when a person or an object is detected to when the detected person or object is determined as a stationary object and excluded from a detection target, may be longer than the stationary object detection time in the detection by the activation detection means.

According to a second aspect of the invention, provided is an automatic door system including a control means that drive-controls a door based on a result of detection of a person or an object in a detection area. In a special detection area that is a part of the detection area, the control means uses a result of detection by an activation detection means detecting a person or an object for drive control of the door when the door is in a closed position, and uses a result of detection by a protection detection means having a higher detection sensitivity for the person or the object than the activation detection means for the drive control of the door when the door is in a position other than the closed position.

In the automatic door system, the detection area may further include an activation detection area in which detection perform only by the activation detection means, and the special detection area may be disposed closer to the door than the activation detection area.

The automatic door system may further include a doorway detection means detecting a person or an object on a track of the door. The detection area may include a second special detection area in which detections by the doorway detection means and the protection detection means are performed. In the second special detection area, the control means may use a result of detection by the protection detection means for drive control of the door when the door is in a fully opened position, and use a result of detection by the doorway detection means for the drive control of the door when the door is in a position other than the fully-opened position.

The automatic door system may further include a fixed-wall side detection means detecting a person or an object in the vicinity of a fixed wall of the door. The detection area may include a third special detection area in which detections by the fixed-wall side detection means and the protection detection means are performed. In the third special detection area, the control means may use a result of detection by the fixed-wall side detection means for drive control of the door when the door is moving to a fully-opened position, and use a result of detection by the protection detection means for the drive control of the door except when the door is moving to the fully-opened position.

In the detection by the protection detection means in the automatic door system, a stationary object detection time, which is time from when a person or an object is detected to when the detected person or object is determined as a stationary object and excluded from a detection target, may be longer than the stationary object detection time in the detection by the activation detection means.

In the detection by the protection detection means in the automatic door sensor, a stationary object detection time, which is time from when a person or an object is detected to when the detected person or object is determined as a stationary object and excluded from a detection target, may be longer than the stationary object detection time in the detection by the activation detection means.

According to a third aspect of the invention, provided is performing, a method of controlling an automatic door system. The method includes, performing, in a special detection area that is a part of a detection area for detecting a person or an object, detection by an activation detection means that detects a person or an object is performed when a door is in a closed position, and using a result of the detection for drive control of the door and, performing, in the special detection area, detection by a protection detection means that has a higher detection sensitivity for the person or the object than the activation detection means when the door is in a position other than the closed position, and using a result of the detection for the drive control of the door.

According to the aspects of the invention, it is possible to achieve both the reduction of the unnecessary opening and closing operations of the door and the improvement of the safety.

BRIEF DESCRIPTION OF THE DRAWINGS

FIG. 15 is a conceptual diagram showing a detection algorithm used in the automatic door system according to the embodiment.

DESCRIPTION OF THE PREFERRED EMBODIMENTS

Figure 1:
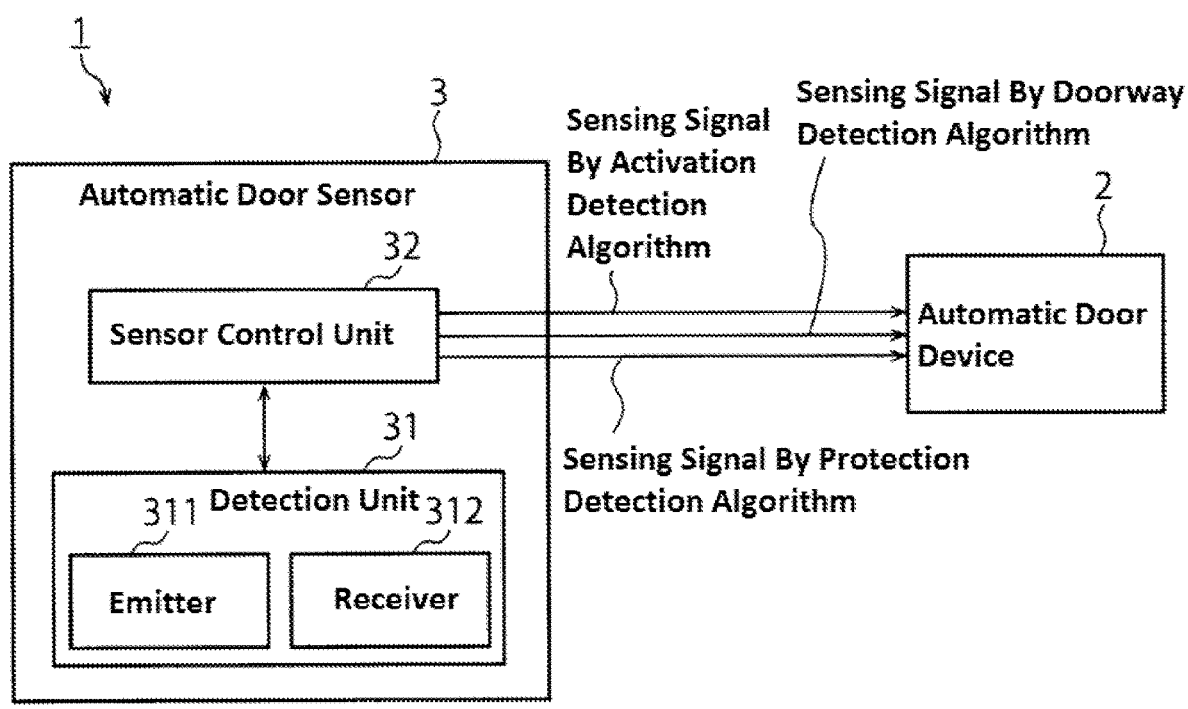
FIG. 1 is a block diagram illustrating an automatic door system according to one embodiment.

An automatic door system according to an embodiment of the invention will now be described with reference to the appended drawings. Embodiments described below are each one example of an embodiment of the invention, and the invention is not intended to be construed as being limited thereto. Furthermore, in the drawings referred to in this embodiment, the same parts or parts having similar functions are denoted by the same or like reference characters, and duplicate descriptions thereof are omitted. Furthermore, for the sake of convenience of description, a dimensional ratio of the drawings is possibly different from an actual dimensional ratio, and some elements of a configuration are possibly omitted from the drawings.

Figure 2:
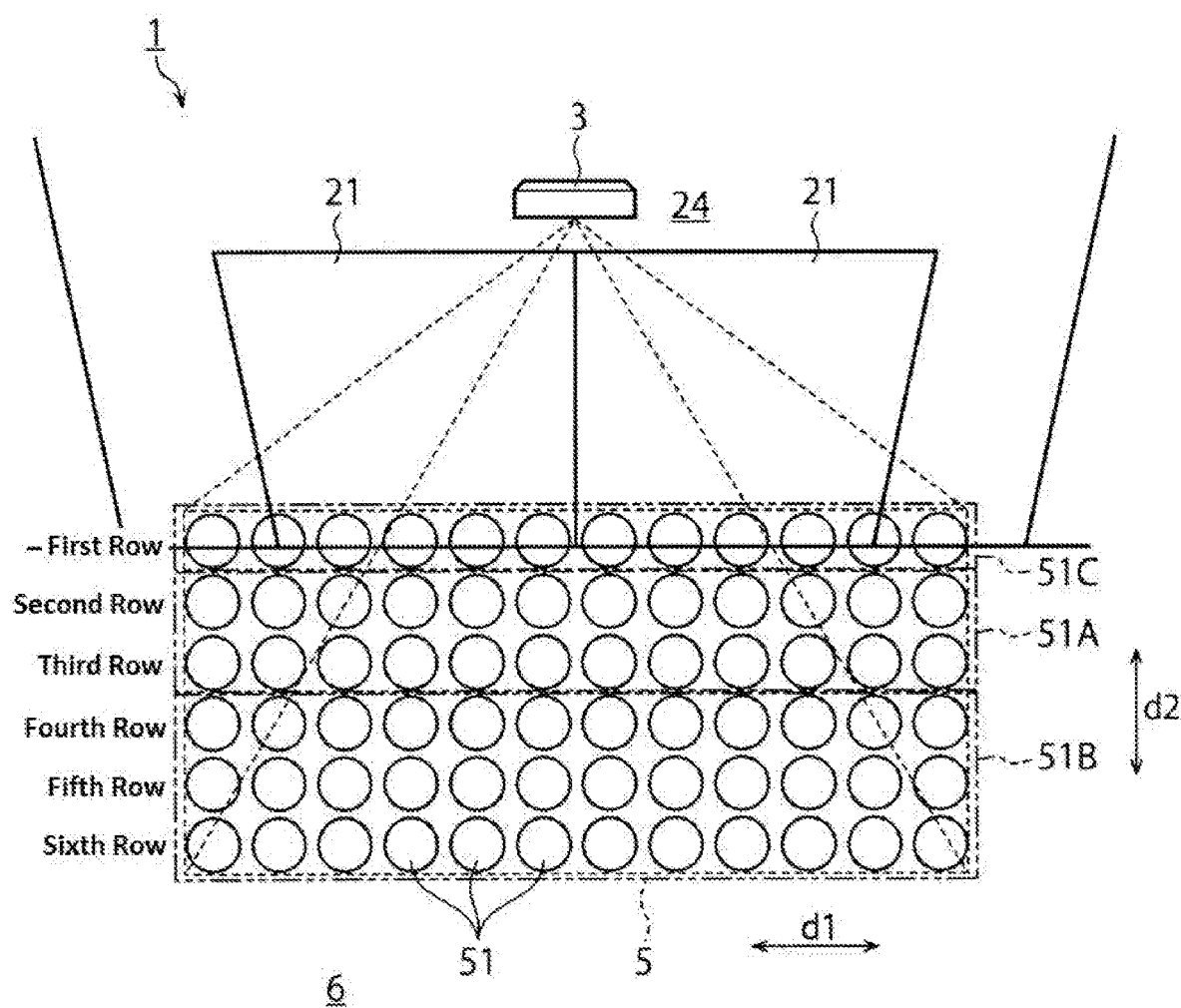
FIG. 2 is a bird's-eye view showing a detection area of the automatic door sensor according to the embodiment.

FIG. 1 illustrates an automatic door system 1 according to one embodiment. FIG. 2 is a bird's-eye view showing a detection area 5 of an automatic door sensor 3 according to the embodiment. Referring to FIG. 1, the automatic door system 1 includes an automatic door device 2 and the door sensor 3. The automatic door system 1 operates to open a door 21 shown in FIG. 2 when the automatic door sensor 3 detects a person who is approaching and going to pass through the door 21 (traffic).

Automatic Door Device 2

The automatic door device 2 includes a motor 22 (not shown) for opening and closing the door 21 in an open-close direction d1 shown in FIG. 2, and a door control unit 23 (not shown) that drive controls the motor based on a signal or information obtained from the automatic door sensor 3. In the example illustrated in FIG. 2, the door 21 is a double-leaf sliding door that is drawn apart to be opened. The type of the door 21 is not limited to the example shown in FIG. 2. Any type of door may be adopted such as a single sliding door, a hinged door, a folding door, and a glide door.

For example, the automatic door sensor 3 supplies a sensing signal corresponding to detection of a person in an effective detection area, which will be described later, to the door control unit 23. In response to reception of the sensing signal, the door control unit 23 performs a control (hereinafter, also referred to as an open drive control) of driving the door 21 in the opening direction.

Automatic Door Sensor 3

As shown in FIG. 2, the automatic door sensor 3 is provided on a transom bar 24 at the middle position thereof, more specifically, above the boundary between the two leaves of the closed door 21 in order to detect a person approaching the door 21. The automatic door sensor 3 may be provided at a place other than the transom bar 24 such as a ceiling or on the lower surface of the transom bar 24.

As shown in FIG. 1, the automatic door sensor 3 includes a detection unit 31 and a sensor control unit 32. The detection unit 31 and the sensor control unit 32 are an example of a detection unit. The sensor control unit 32 is connected to the detection unit 31 and the automatic door device 2. The sensor control unit 32 includes hardware such as a CPU, a ROM, and a RAM. Software may be used to realize at least a part of the sensor control unit 32. The detection unit 31 includes an emitter 311 and a receiver 312.

The sensor control unit 32 has an effective detection area. As shown in FIG. 2, the effective detection area is set in at least a part of a detection area 5 that is an area detectable by the automatic door sensor 3 for detection of a person approaching the door 21. FIG. 2 shows the relative position of the detection area 5 on a floor surface 6.

The emitter 311 includes an optical lens (not shown) for emitting light and a plurality of light emitting elements (not shown). The emitter 311 irradiates, that is, emits near infrared light in a pulse form to the detection area 5 from each of the plurality of light emitting elements. The receiver 312 includes an optical lens (not shown) for receiving light and a plurality of light receiving elements (not shown) optically corresponding to the plurality of light emitting elements of the emitter 311. The receiver 312 receives the near infrared light that is irradiated onto the detection area 5 from each of the plurality of light emitting elements in the emitter 311 by the corresponding light receiving elements, and senses the amount of the near infrared light received by each light receiving element. The receiver 312 outputs the sensed amount of the light to the sensor control unit 32 as a sensing signal having a signal value corresponding to the amount of light received. Alternatively, the emitter 311 and the receiver 312 may emit and receive light other than the near infrared light. Furthermore, the emitter 311 and the receiver 312 may use another type of optical system instead of the optical lenses for light emitting and receiving, and an optical lens may not necessarily be used.

In the example of FIG. 2, the detection area 5 includes a plurality of small detection areas 51 arranged at intervals in the open-close direction d1 of the door 21 and the front-back direction d2 orthogonal to the open-close direction 21 at the front of the double-leaf sliding door 21. Specifically, there are a total of 72 small detection areas 51, which is calculated as six columns×12, as shown in FIG. 2.

Each small detection area 51 corresponds to an irradiation spot of near-infrared light that is emitted from the corresponding one of the plurality of light emitting elements in the emitter 311 and is respectively received by the corresponding one of the plurality of light receiving elements in the receiver 312.

The effective detection area in the example of FIG. 2 includes at least one small detection area 51 among the plurality of small detection areas 51. In the example of FIG. 2, each small detection area 51 has a circular shape. In this case, the diameter of the small detection area 51 at the floor surface 6 may have, for example, any value between 10 cm and 30 cm. The small detection area 51 may have a shape other than a circular shape such as an elliptical shape, a rectangular shape, and a polygonal shape.

How to determine which small detection area 51 among the plurality of small detection areas 51 is to be set as the effective detection area is not particularly limited. For example, the effective detection area may be predetermined before the start of use of the automatic door system 1. Further, the effective detection area may be variable depending on the door position or the like.

The sensor control unit 32 causes all the light emitting elements in the emitter 311 to emit near infrared light toward the corresponding small detection areas 51. The sensor control unit 32 subsequently causes all the light receiving elements in the receiver 312 to receive reflected light of the near infrared light from the corresponding small detection areas 51. Then, the sensor control unit 32 selects a sensing signal of the effective detection area from among the sensing signals of the small detection areas 51 supplied from the receiver 312.

Based on the selected sensing signal of the effective detection area, the sensor control unit 32 detects a person or an object in accordance with an activation detection algorithm and a protection detection algorithm which will be described later. In the detection of a person or object approaching, the sensor control unit 32 stores, for example, a signal value (that is, the amount of light received) of the sensing signal of the effective detection area immediately after power on of the automatic door sensor 3 as a reference value. The sensor control unit 32 may detect a person or object based on a change of the signal value relative to the reference value. When a person or object situated in the effective detection area is detected, the sensor control unit 32 outputs a sensing signal to the automatic door device 2. In this way, the detection result in the effective detection area is used for a drive control to open the door 21.

In particular, the sensor control unit 32 detects a person or object situated in a special detection area 51A, which will be described later, using two types of detection algorithms, that are, the activation detection algorithm and the protection detection algorithm. Note that there may be more than one activation detection algorithm, and more than one protection detection algorithm. By providing two or more detection algorithms, it is possible to select an appropriate detection algorithm depending on the installation environment of the automatic door sensor 3 and the conditions of the person or object.

The sensor control unit 32 may cause only the light emitting element(s) corresponding to the effective detection area to emit the near infrared light, instead of causing all the light emitting elements in the emitter 311 to emit the near infrared light. In this case, all the small detection areas 51 to which the near infrared light is irradiated become the effective detection area. By causing only the light emitting element(s) corresponding to the effective detection area to emit the near infrared light, it is possible to reduce power consumption. In addition, it is also possible to extend the life of the light emitting elements.

Detection Algorithms Applied to Detection Area 5

As shown in FIG. 2, the sensor control unit 32 has the special detection area 51A as a part of the plurality of small detection areas 51 constituting the detection area 5. Regardless of the open/close state of the door 21, detection is performed in the special detection area 51A in accordance with the activation detection algorithm for detecting a person or object and the protection detection algorithm having the detection sensitivity for the person or the object higher than the activation detection algorithm. The detection results obtained through these detection algorithms are individually output and used for the drive control of the door 21. That is, detections for the same special detection area 51A are performed using the activation detection algorithm and the protection detection algorithm. Thus, the detection areas to which the activation detection algorithm and the protection detection algorithm are performed coincide with each other. Unlike a case where the activation detection algorithm and the protection detection algorithm each have an independent detection area and the two algorithms are independently performed for the detection area by physically different sensors, it is not necessary to align the detection area to which the activation detection algorithm is applied with the detection area to which the protection detection algorithm is applied.

The activation detection algorithm is, for example, a detection algorithm for detecting a person or object approaching and opening (that is, activating) the door 21. The activation detection algorithm focuses on reducing the malfunction of the door 21 due to false detection of the automatic door sensor 3 stemming from influences of the structure of the automatic door system 1 and the installation environment of the automatic door system 1. The activation detection algorithm uses a process in which the sensitivity of the automatic door sensor 3 is relatively low. Specifically, as a reference value or algorithm for determining that a person or object is present from the signal value (physical value) detected by the automatic door sensor 3, the activation detection algorithm uses one that is relatively insensitive so that it less frequently determines that the person or object is present. As such an algorithm, there are one that prevents false detection due to snowfall, and one that prevents false detection due to an insect flying around the automatic door sensor 3. The activation detection algorithm is suitable for reducing unnecessary opening and closing operations of the door 21. In the embodiment, an activation detection means includes the detection unit 31 and the sensor control unit 32 that executes the activation detection algorithm.

The protection detection algorithm is a detection algorithm focusing on detecting, for example, a person stopping near the door 21 or an object present in the vicinity of the door 21 in order to protect the person or object from collision with the door 21, for example, to prevent the person or object from being caught in the closing door 21. The protection detection algorithm uses a process in which the sensitivity of the automatic door sensor 3 is relatively high. Specifically, as a reference value or algorithm for determining that a person or object is present from a signal value (physical value) detected by the automatic door sensor 3, the protection detection algorithm uses one that is relatively sensitive so that it tends to easily determine that the person or object is present. The protection detection algorithm is suitable for safety improvement. In the embodiment, a protection detection means includes the detection unit 31 and the sensor control unit 32 that executes the protection detection algorithm.

The activation detection algorithm and the protection detection algorithm are stored in the sensor control unit 32 that performs detection of an person approaching.

The door control unit 23 opens or closes the door 21 based on an activation detection algorithm sensing signal corresponding a result of a detection performed in accordance with the activation detection algorithm and a protection detection algorithm sensing signal corresponding to a result of a detection performed in accordance with the protection detection algorithm. In the closing operation of the door 21, when a person approaching is detected in accordance with the protection detection algorithm, the door control unit 23 may cause the door 21 to be opened, stop the closing operation of the door 21, or cause the door 21 to be closed at a low speed.

In the special detection area 51A, it is possible to use, for the driving control of the door 21, a result of detection performed in accordance with the activation detection algorithm in which the sensitivity of the automatic door sensor 3 is set relatively lower than that of the protection detection algorithm. Here, the activation detection algorithm uses, as the reference value or algorithm for determining that a person or object is present from a signal value (physical value) detected by the automatic door sensor 3, one that is insensitive relative to the protection detection algorithm so that it less frequently determines that the person or object is present.

Further, in the special detection area 51A, it is also possible to use, for the driving control of the door 21, a result of detection performed in accordance with the protection detection algorithm in which the sensitivity of the automatic door sensor 3 is set relatively higher than that of the activation detection algorithm. Here, the protection detection algorithm uses, as the reference (threshold value) or algorithm for determining that a person or object is present from a signal value (physical value) detected by the automatic door sensor 3, one that is relatively more sensitive than the activation detection algorithm so that it tends to easily determine that the person or object is present.

As described above, in the special detection area 51A, since the automatic door device (door control unit 23) operates based on the detection results in accordance with both the activation detection algorithm and the protection detection algorithm, reduction of unnecessary opening and closing operations of the door 21 and the improvement of safety can be achieved at the same time. The special detection area 51A is an example of a special detection area.

The standard requires that the detection area to which the protection detection algorithm is applied be situated within 200 mm from the door 21. Thus, the special detection area 51A is set as a small detection area 51A situated at the second and third rows of the small detection areas counting from the row closest to the door 21 as shown in FIG. 2. When the small detection area 51A situated at the second and third rows is set as the special detection area 51A, the standard can be satisfied, and the safety in the vicinity of the door 21 can be further improved. The number of rows of the small detection areas that are set as the special detection area 51A can be changed depending on the size of each small detection area 51.

Further, as shown in FIG. 2, the sensor control unit 32 may further has a small detection area 51B that is different from the special detection area 51A and set in the area of the plurality of small detection areas 51. Only a detection in accordance with the activation detection algorithm is performed in the small detection area 51B. Alternatively detections in accordance with both the activation detection algorithm and the protection detection algorithm may be performed in the activation detection area 51B, and only a result of the detection in accordance with the activation detection algorithm may be used for the drive control of the door 21 regardless of the position of the door 21. The special detection area 51A may be disposed closer to the door 21 than the activation detection area 51B. In the example of FIG. 2, the activation detection area 51B is the small detection area 51B situated at the fourth to sixth columns. By setting the activation detection area 51B at a position distant from the door 21 where chances of false detection caused by a person standing, stopped walking or the like are small, it is possible to effectively reduce false detections in the detection area 5 away from the door 21.

In the small detection area 51C at the first row may be an area where detection in accordance with only the activation detection algorithm is performed when the door 21 is closed, whereas when the door 21 is open, the area is invalidated in order to prevent false detections such as detecting the door 21 as a person approaching and the like. Here, "invalid" or "invalidated" encompass meaning that the sensing signal is not treated as a valid signal even if the detection is properly performed, and meaning that the detection operation is stopped so that the detection is not performed (the same applies hereinafter).

Further, the sensor control unit 32 may further has a protection detection area where detection in accordance with only the protection detection algorithm is performed as another small detection area 51 other than the special detection area 51A and the activation detection area 51B among the plurality of small detection areas 51. For example, the small detection area 51C at the first row may be used as the protection detection area. Even when the small detection area 51C at the first row is set as the protection detection area, in order to prevent false detections as the sensor detects the door 21 as a person approaching and the like, small detection area(s) 51 corresponding to the positions where the door 21 is situated may be invalidated while the door 21 is moving. Alternatively the sensitivity of the detection for such a small detection area(s) may be lowered than the activation detection area 51B (so that the false detection due to the door 21 is unlikely occurred). This detection algorithm in the embodiment is herein referred to as a doorway detection algorithm. In this case, the special detection area 51C serves as a second special detection area, and the detection unit 31 and the sensor control unit 32 executing the doorway detection algorithm serve as a doorway detection means. In the case where the small detection area 51C at the first row is used as the protection detection area, the special detection area 51A is disposed between the activation detection area 51B and the protection detection area 51C. In this case, according to the switching of the detection algorithm applied to the special detection area 51A, it is possible to expand the small detection area(s) 51 where the detection by the activation detection algorithm is performed or the small detection area(s) 51 where the detection by the protection detection algorithm is performed In this way, it is possible to achieve both the reduction of the unnecessary opening and closing operations of the door 21 and the improvement of the safety more effectively.

In the detection in accordance with the protection detection algorithm, a stationary object detection time, which is time from when a person or object is detected to when the detected person or object is determined as a stationary object (that is, the background) and excluded from the detection target, may be longer than the stationary object detection time in the detection in accordance with the activation detection algorithm. A specific example of the stationary object detection time is not particularly limited. For example, the stationary object detection time in the activation detection algorithm may be 5 seconds, and the stationary object detection time in the protection detection algorithm may be 30 seconds. By making the stationary object detection time in the protection detection algorithm longer than the stationary object detection time in the activation detection algorithm, it becomes possible to detect a person standing by the door for a long time. In this way, the safety is improved. Whereas when the stationary object detection time in the activation detection algorithm is made shorter than the stationary object detection time in the protection detection algorithm, influence of disturbance can be reduced so that unnecessary opening and closing operations of the door 21 can be prevented.

Further, the sensor control unit 32 may have an exit-side detection area (hereinafter also referred to as an exit-side activation detection area) where detection in accordance with only the activation detection algorithm is performed and another exit-side detection area (hereinafter also referred to as an exit-side protection detection area) where detection in accordance with only the protection detection algorithm is performed. In this case, the sensor control unit 32 may perform an exit invalid control that invalidates the exit detection area when nothing is detected in the protection detection area on the exit side. By performing the exit invalid control, it is possible to reducing the time length when the door 21 is opened while preventing the safety deterioration.

Further, the sensor control unit 32 may performs a traverse invalid control that invalidates the activation detection area 51B when it is detected that a person or object is moving only in a direction along the door 21 in the activation detection area 51B. The "direction along the door 21" may be the opening-closing direction d1 shown in FIG. 2 or a direction having an angle with the opening-closing direction d1 smaller than a threshold (that is, a direction almost same as the opening-closing direction d1). By performing the traverse invalid control, it is possible to more effectively prevent the unnecessary opening and closing operations of the door 21 and to prevent the safety deterioration.

The activation detection algorithm and the protection detection algorithm are not limited to one type each, and two or more types may be provided. When multiple types of the protection detection algorithm are used, such protection detection algorithms may be switched depending on the door position, the state of the door control, the control state of the sensor and the like. Alternatively two or more protection detection algorithms may be concurrently executed and then necessary one at the time may be selected from among them.

Operation Examples

Figure 3:
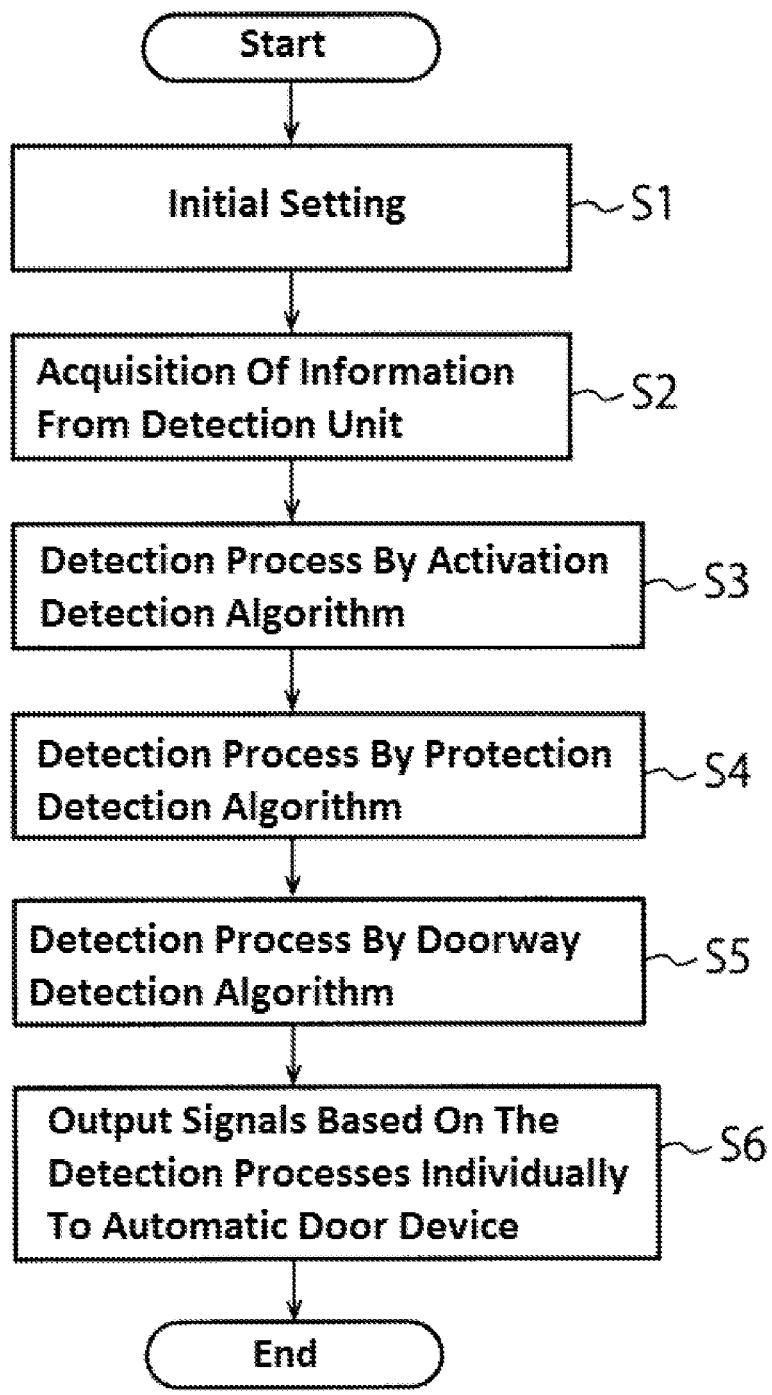
FIG. 3 is a flowchart for describing an operation of the automatic door sensor according to the embodiment.

An operation example of the automatic door system 1 will now be described. FIG. 3 is a flowchart illustrating operation of the automatic door sensor 3 in the operation example of the automatic door system according to the embodiment. The process shown in the flowchart of FIG. 3 may be repeatedly carried out as necessary.

Referring to FIG. 3, parameters necessary for processing of the stationary object detection time and the like are loaded, and an initial setting is performed (step S1). Physical information about the detection area 5 obtained by the detection unit 31 is then acquired (step S2). The activation detection algorithm is applied to the acquired physical information, and a detection process to determine whether there is a person approaching or the like is performed (step S3). Furthermore, the protection detection algorithm is applied to the acquired physical information, and a detection process to determine whether there is a person approaching or the like is performed (step S4). Moreover, the doorway detection algorithm is applied to the acquired physical information, and a detection process to determine whether there is a person approaching or the like is performed (step S5). Next, sensing signals (contact signals) or detection information (data communication) based on the result of the detection process by the activation detection algorithm and the result of the detection process by the protection detection algorithm are individually outputted to the automatic door device 2 (step S6).

In particular, in the special detection area 51A, both the activation detection algorithm and the protection detection algorithm are applied to the same physical information, and a detection process is performed to determine whether there is a person approaching or the like.

The detection process (step S5) to which the doorway detection algorithm has been applied may be omitted as necessary.

Detection and Background Update Control

Next, a detection control commonly performed in each algorithm by the sensor control unit 32 and a background update control after the stationary object detection time has elapsed will be described with reference to the flowchart of FIG. 4. The process shown in the flowchart of FIG. 4 may be repeatedly carried out as necessary.

In the detection control and the background update control, the sensor control unit 32 first calculates an increase-side threshold value and a decrease-side threshold value of the amount of light received based on a value of the amount of light received stored in advance (an background value that is referenced for determination) and a sensitivity parameter(s) loaded in the initial setting at step S1. The threshold values are determined with reference to the stored value of the amount of light received in order to determine that a person is detected (step S221).

Figure 5:
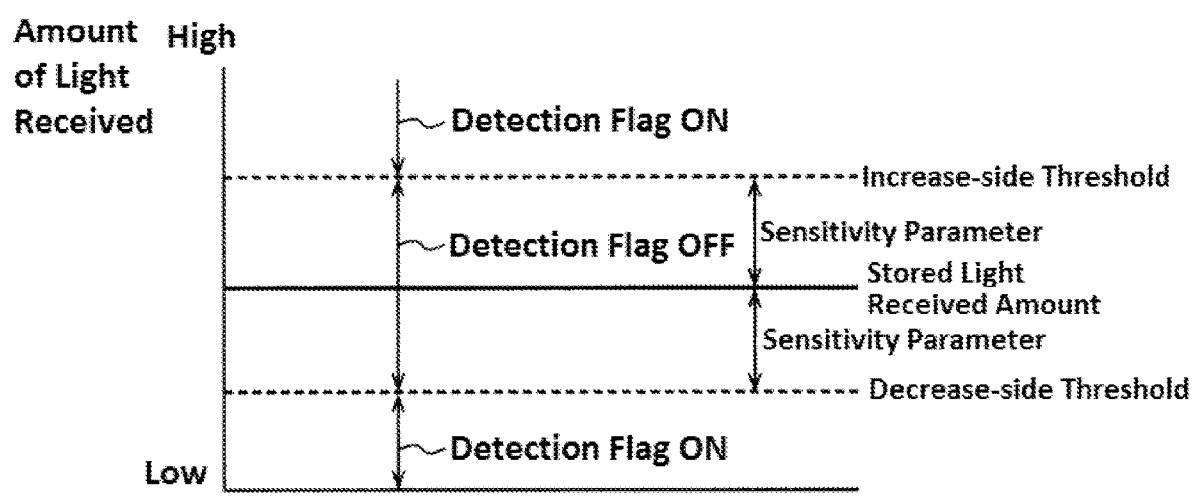
FIG. 5 is an explanatory view for describing the detection and the stationary object detection time control performed by the automatic door sensor according to the embodiment.

FIG. 5 is an explanatory diagram for describing the detection and background update controls in the operation example of the automatic door system 1 according to the embodiment. FIG. 5 shows the relations between the amount of light received indicated by the sensing signal of the small detection area 51, the stored value of the light received amount, the sensitivity parameter, the increase-side threshold, the decrease-side threshold, and the state of the detection flag. As shown in FIG. 5, the sensitivity parameter indicates how much the amount of light received should be increased or decreased from the stored value of the amount of light received (the reference value) to be determined that an object is detected. The stored value of the amount of light received (the reference value) may be acquired at a predetermined time such as immediately after power-on of the automatic door system 1. Thus, the smaller the sensitivity parameter, the higher the sensitivity.

In the example of FIG. 5, the increase-side threshold is obtained by adding the sensitivity parameter to the stored value of the amount of light received. When the sensed amount of light received changes within the stationary object detection time frame, which will be described later, and the sensed amount of light received is equal to or greater than the increase-side threshold, the sensor control unit 32 turns on the detection flag which means that a person the like is detected. In the example of FIG. 5, the decrease-side threshold is obtained by subtracting the sensitivity parameter from the stored value of the amount of light received. When the sensed amount of light received changes within the stationary object detection time frame which will be described later and the sensed amount of light received is equal to or less than the decrease-side threshold, the sensor control unit 32 turns on the detection flag which means that a person the like is detected. Whereas when the sensed amount of light received is larger than the decrease-side threshold and smaller than the increase-side threshold, the sensor control unit 32 turns off the detection flag which means that a person or the like is not detected, in other words, a not-detected state. The detection flag is set, for example, in a storage of the automatic door device 2.

Figure 4:
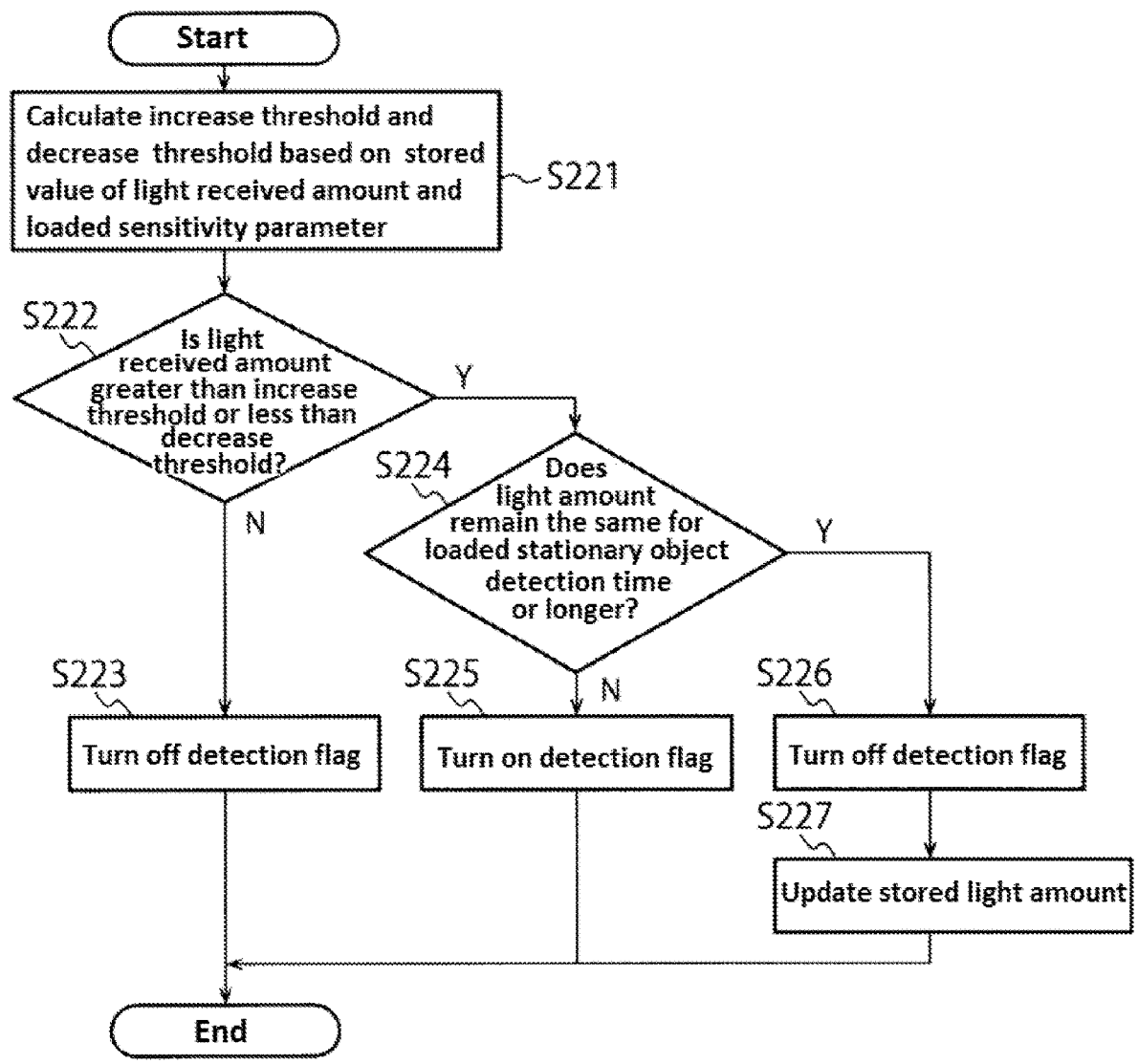
FIG. 4 is a flowchart for describing detection and a stationary object detection time control performed by the automatic door sensor according to the embodiment.

As shown in FIG. 4, after calculating the increase-side threshold and the decrease-side threshold, the sensor control unit 32 determines whether the amount of light received indicated by the sensing signal is equal to or greater than the increase-side threshold or equal to or less than the decrease-side threshold. (Step S222).

When the amount of light received is not equal to or greater than the increase-side threshold or not equal to or less than the decrease-side threshold (step S222: N), the sensor control unit 32 turns off the detection flag (step S223).

Whereas when the amount of light received is equal to or greater than the increase-side threshold or equal to or less than the decrease-side threshold (step S222: Y), the sensor control unit 32 determines whether the amount of light indicated by the sensing signal remains the same for the stationary object detection time or longer that has been loaded in step S212 in FIG. 7 (step S224).

When the amount of light received has changed within the stationary object detection time (the time frame in which the background is not updated and stays the same) (step S224: N), the sensor control unit 32 turns on the detection flag (step S225). Whereas when there is no change in the amount of light received during the stationary object detection time or longer (step S224: Y), the sensor control unit 32 turns off the detection flag (step S226). After turning off the detection flag, the sensor control unit 32 updates the stored value of the amount of light received to the current value of the amount of light received (step S227).

Exit Invalid Control

The sensor control unit 32 may perform the exit invalid control in the activation detection algorithm but does not perform it in the protection detection algorithm. The exit invalid control will be now described. In the exit invalid control, the sensor control unit 32 first determines whether the detection flag is on. When the detection flag is not on, the sensor control unit 32 ends the exit invalid control while the detection flag remains turned off.

Whereas when the detection flag is on, the sensor control unit 32 determines whether a protection detection area 52A on the exit side, which is set among a plurality of small detection areas 52 on the exit side of the door 21 (the opposite side of the door 21), has become the not-detected state, based on the sensing signal of the protection detection area 52A.

When the protection detection area 52A on the exit side is in the not-detected state, the sensor control unit 32 turns off the detection flag. Whereas when the protection detection area 52A on the exit side is not in the not-detected state, the sensor control unit 32 ends the exit invalid control while the detection flag remains turned on.

Traverse Invalid Control

The sensor control unit 32 may perform the traverse invalid control in the activation detection algorithm but does not perform it in the protection detection algorithm. The traverse invalid control will be now described. In the traverse invalid control, the sensor control unit 32 first determines whether the detection flag is on. When the detection flag is not on, the sensor control unit 32 ends the traverse invalid control while the detection flag remains turned off.

Whereas when the detection flag is on, the sensor control unit 32 determines whether a person is moving only in the traverse direction in front of the door 21 (in other words, the direction along the door 21) based on a movement vector of the person obtained from a change in the small detection areas 51 in the detected state.

When the person moves only in the traverse direction in front of the door 21, the sensor control unit 32 turns off the detection flag. Whereas when the person is not moving in the traverse direction in front of the door 21, the sensor control unit 32 ends the traverse invalid control while the detection flag remains turned on.

In the detection determination, the sensor control unit 32 checks whether the detection flag is on. When the detection flag is not on, the sensor control unit 32 determines that a person approaching, an object and the like is not detected. Whereas when the detection flag is on, the sensor control unit 32 determines that a person approaching, an object and the is detected. The determination results are individually output to the automatic door device 2 (step S6).

As described above, the detection processes in accordance with the algorithms are performed. The execution order of the algorithms may be changed. Also, one or more of the detection algorithms may be omitted. In the above-described example, the sensing signal by the activation detection algorithm and the sensing signal by the doorway detection algorithm are outputted through different contacts or different flags in data communication packets. However, the invention is not limited to this. Alternatively, they may be outputted through the same contact or the same flag in data communication packets. When they are outputted through the same contact or the same flag in the data communication packets, it is possible to reduce the number of wirings required.

In the embodiment, both detection in accordance with the activation detection algorithm and detection in accordance with the protection detection algorithm are performed in the special detection area 51A. According to the embodiment, it is possible to achieve both the reduction of the unnecessary opening and closing operations of the door and the improvement of the safety.

Since sensing is performed in the identical special detection area 51A using the activation detection algorithm and the protection detection algorithm, unlike a case where the activation detection algorithm and the protection detection algorithm each have an independent detection area and the two algorithms are independently performed for the detection area by physically different sensors, it is not necessary to align the detection area to which the activation detection algorithm is applied with the detection area to which the protection detection algorithm is applied.

First Modification Example

Figure 6:
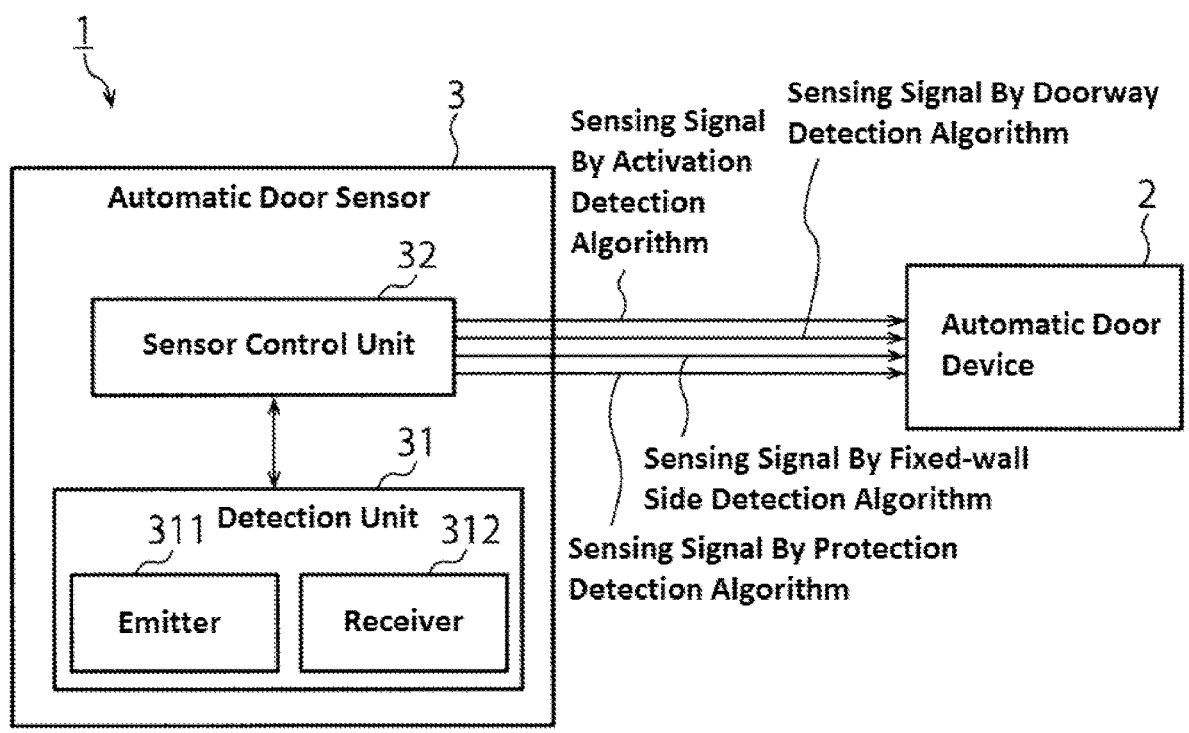
FIG. 6 is a block diagram illustrating an automatic door system according to a first modification example.

A description is given of a first modification example in which a detection area 51D (third special detection area) is provided in the vicinity of a fixed wall located on the trailing edge side of the door 21 when the door 21 is fully closed, and a detection in accordance with only a fixed-wall side detection algorithm is performed in the detection area 51D to detect a person approaching and the like. The detection area 51D is provided on the side where the door 21 is situated when opened in the vicinity of the fixed wall in order to monitor that a person approaching and the like does not contact the trailing edge of the door 21 when the door 21 is opening. The width of the area is at least as large as the width of the door 21 or larger and the length of the area (the dimension in the direction perpendicular to the fixed wall) is at least as large as the thickness of the door 21 or larger. FIG. 6 is a block diagram illustrating the automatic door system 1 according to the first modification example of the embodiment. As shown in FIG. 6, the automatic door sensor 3 of the first modification example is provided with the sensor control unit 32 capable of executing a fixed-wall side detection algorithm in addition to the above-described detection algorithms. The fixed-wall side detection algorithm is executed only when the door 21 is operated to be opened (including fully closed state). The fixed-wall side detection algorithm may be executed at any stage as long as it is before step S6 and after step S2 in the flowchart of FIG. 3. In the above-described configuration, it is possible to improve the safety in the area around the trailing edge of the door 21. In this embodiment, the detection unit 31 and the sensor control unit 32 that executes the fixed-wall side detection algorithm serve as a fixed-wall side detection means. To execute the fixed-wall side detection algorithm, setting of the detection flag is performed in advance in the same manner as the example of the detection and background update control described above and therefore the description will be omitted.

Alternatively the fixed-wall side detection algorithm may be executed all the time. Further, the width of the detection area 51D may be dynamically changed depending on the position of the door 21. Furthermore, in the case where the door 21 is configured to be stored in the door case, the detection area 51D may be provided around the opening of the door case in order to monitor a person approaching to prevent his/her finger or the like from being caught by the door. The execution order of the algorithms may be changed.

Further, one or more of the detection algorithms may be omitted. In the above-described example, the sensing signal by the activation detection algorithm, and the sensing signal by the fixed-wall side detection algorithm are outputted through the same contact or the same flag in data communication packets. However, the invention is not limited to this. Alternatively, they may be outputted through different contacts or different flags in data communication packets. Moreover, the sensing signal by the fixed-wall side detection algorithm may be output through the same contact or same flag in the data communication packets as the sensing signal by the protection detection algorithm.

According to the first modification example, it is also possible to achieve both the reduction of the unnecessary opening and closing operations of the door and the improvement of the safety. In the first modification example, since sensing is performed in the identical special detection area 51A using the activation detection algorithm and the protection detection algorithm, unlike a case where the activation detection algorithm and the protection detection algorithm each have an independent detection area and the two algorithms are independently performed for the detection area by physically different sensors, it is not necessary to align the detection area to which the activation detection algorithm is applied with the detection area to which the protection detection algorithm is applied. Further, according to the first modification example, it is also possible to improve the safety in the area around the fixed wall (the area around the trailing edge of the door 21).

Second Modification Example

Figure 7:
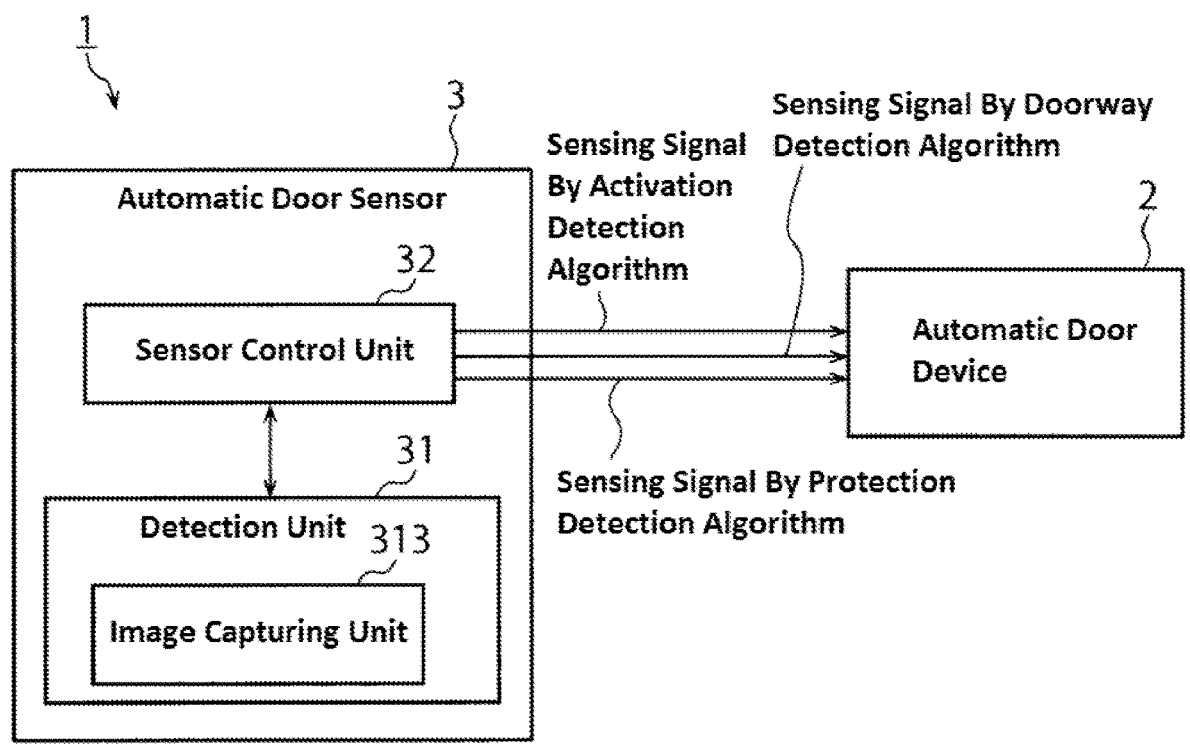
FIG. 7 is a block diagram illustrating an automatic door system according to a second modification example.

A description is given of a second modification example in which detection based on a captured image is performed. FIG. 7 is a block diagram illustrating the automatic door system 1 according to the second modification example of the embodiment. As shown in FIG. 7, the automatic door sensor 3 of the second modification example includes an image capturing unit 313 as an example of the detection unit instead of the emitter 311 and the receiver 312. The image capturing unit 313 is, for example, a CCD or CMOS camera having sensitivity in the visible light range. The image capturing unit 313 may be an infrared camera having sensitivity in the infrared range.

The image capturing unit 313 captures an image of the detection area 5, and outputs a sensing signal indicating the captured image of the detection area 5 to the sensor control unit 32. The sensor control unit 32 detects a person approaching or the like based on the sensing signal supplied from the image capturing unit 313, and outputs a sensing signal of the person and the like to the automatic door device 2.

In the second modification example, a high precision image is captured by the image capturing unit 313 and a person approaching and the like can be detected with high accuracy based on the high precision image. Therefore it is possible to achieve both the reduction of the unnecessary opening and closing operations of the door and the improvement of the safety. Also in the second modification example, since sensing is performed in the identical special detection area 51A using the activation detection algorithm and the protection detection algorithm, unlike a case where the activation detection algorithm and the protection detection algorithm each have an independent detection area and the two algorithms are independently performed for the detection area by physically different sensors, it is not necessary to align the detection area to which the activation detection algorithm is applied with the detection area to which the protection detection algorithm is applied.

Third Modification Example

Figure 8:
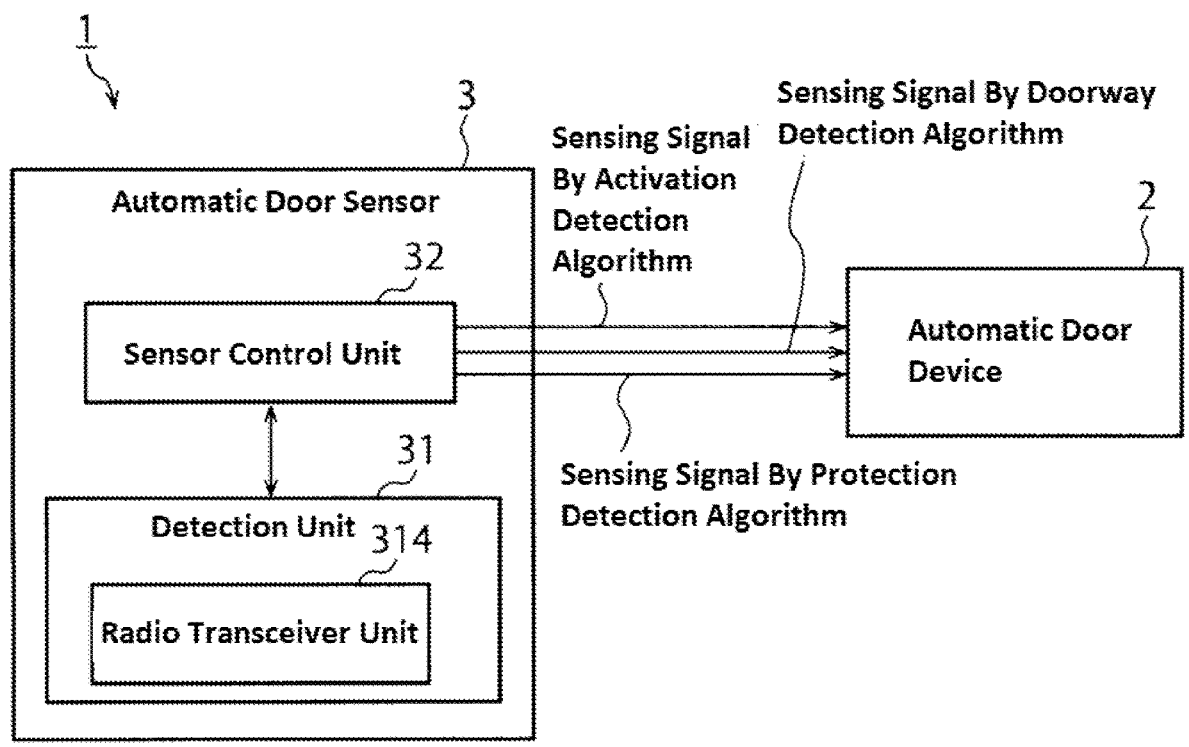
FIG. 8 is a block diagram illustrating an automatic door system according to a third modification example.

A description is given of a third modification example in which detection utilizing the Doppler effect of a radio wave is performed. FIG. 8 is a block diagram illustrating the automatic door system 1 according to the third modification example of the embodiment. As shown in FIG. 8, the automatic door sensor 3 of the third modification example includes a radio transceiver unit 314. The radio transceiver unit 314 transmits a radio wave to the detection area 5 and detects an interference wave between a transmitted radio wave and a reflected wave reflected by a person approaching or the like in the detection area 5. The radio transceiver unit 314 then supplies a sensing signal that indicates the interference wave to the sensor control unit 32. The sensor control unit 32 performs detection of a person approaching and the like based on the sensing signal supplied from the radio transceiver unit 314, and outputs a sensing signal about the person approaching and the like to the automatic door device 2.

According to the third modification example, it is also possible to achieve both the reduction of the unnecessary opening and closing operations of the door and the improvement of the safety. Also in the third modification example, since sensing is performed in the identical special detection area 51A using the activation detection algorithm and the protection detection algorithm, unlike a case where the activation detection algorithm and the protection detection algorithm each have an independent detection area and the two algorithms are independently performed for the detection area by physically different sensors, it is not necessary to align the detection area to which the activation detection algorithm is applied with the detection area to which the protection detection algorithm is applied.

Fourth Modification Example

Figure 9A:
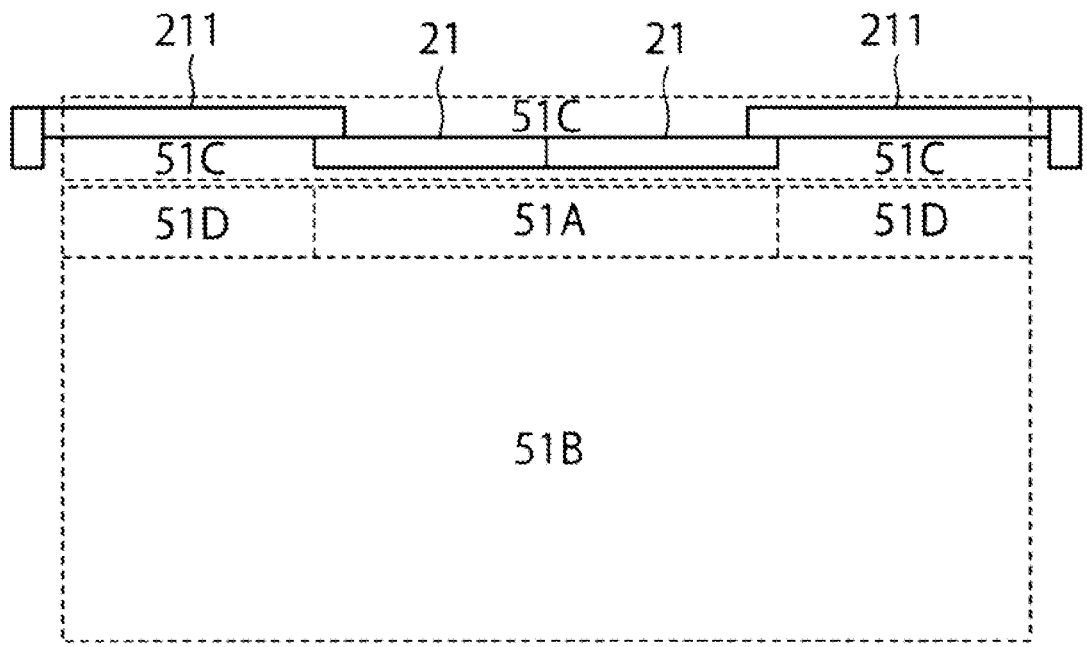
FIG. 9a is a plan view showing a detection area of an automatic door sensor according to a fourth modification example of the embodiment when doors are fully closed.
Figure 9B:
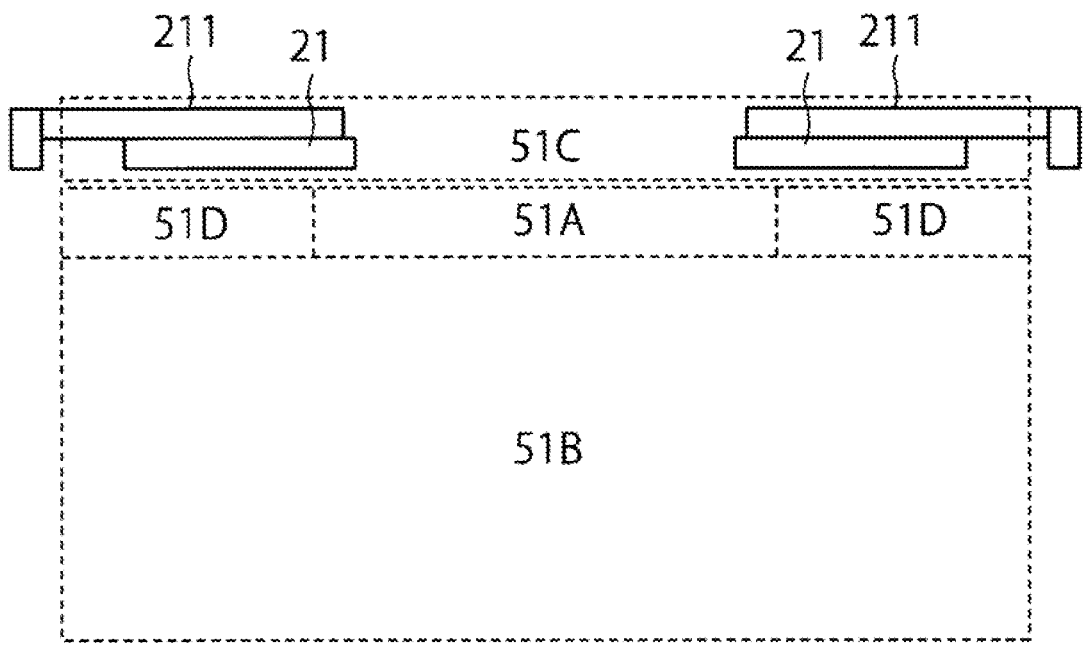
FIG. 9b is a plan view showing a detection area of the automatic door sensor according to the fourth modification example of the embodiment when the doors are fully opened.

A more specific application example of the special detection area and the activation detection area to a double-leaf sliding door will be described. FIG. 9a is a plan view showing a detection area of the double-leaf sliding door when the door is fully closed as the detection area of the automatic door sensor according to the fourth modification example. FIG. 9b is a plan view showing a detection area of the double-leaf sliding door when the door is fully opened as the detection area of the automatic door sensor according to the fourth modification example.

As shown in FIG. 9A, the sensor control unit 32 (see FIG. 1 and the like) has the special detection area 51A that has been described above with reference to FIG. 2 in front of the fully opened double-leaf sliding door 21 (shown on the lower side of the door in FIG. 9a). Further, the sensor control unit 32 has the activation detection area 51B that has been described with reference to FIG. 2 at a position further from the front of the fully closed door 21 than the special detection area 51A. Further, the sensor control unit 32 has the second special detection area 51C that has been described with reference to FIG. 2 on a track of the double-leaf sliding door 21, that is, on the doorway. In addition, the sensor control unit 32 has the third special detection area 51D that has been described in the first modification, in front of the fixed wall 211 and the second special detection area 51C.

In the fourth modification example, when the door is fully closed, the sensor control unit 32 performs detection in accordance with the doorway detection algorithm and the fixed-wall side detection algorithm in the second special detection area 51C shown in FIG. 9a. In this case, the sensor control unit 32 may collectively output the detection results by the doorway detection algorithm and the fixed-wall side detection algorithm. Further, the sensor control unit 32 performs detection in accordance with the fixed-wall side detection algorithm in the third special detection area 51D shown in FIG. 9a. Moreover, the sensor control unit 32 performs detection in accordance with the activation detection algorithm in the special detection area 51A and the activation detection area 51B shown in FIG. 9a.

Whereas when the door is fully opened, the sensor control unit 32 performs detection in accordance with the doorway detection algorithm and a closing protection detection algorithm in the second special detection area 51C shown in FIG. 9b. In this case, the sensor control unit 32 may collectively output the detection results by the doorway detection algorithm and the closing protection detection algorithm. Here, the closing protection detection algorithm is one mode of the protection detection algorithm for detecting a person or object standing in the opened space between the door panels 21 when the door 21 is closing in order to protect the person or object from collision with the door 21 such as the person is caught by the closing door 21. Moreover, the sensor control unit 32 performs detection in accordance with the activation detection algorithm in the special detection area 51D and the activation detection area 51B shown in FIG. 9b. The sensor control unit 32 performs detection in accordance with the activation detection algorithm and the closing protection detection algorithm in the special detection area 51A shown in FIG. 9b.

According to the fourth modification example, it is possible to achieve both the reduction of the unnecessary opening and closing operations of the double-leaf sliding door and the improvement of the safety. Moreover, it is possible to improve the safety in the area around the fixed wall (the area around the trailing edge of the door 21). Also in the fourth modification example, since sensing is performed in the identical special detection area 51A using the activation detection algorithm and the protection detection algorithm, unlike a case where the activation detection algorithm and the protection detection algorithm each have an independent detection area and the two algorithms are independently performed for the detection area by physically different sensors, it is not necessary to align the detection area to which the activation detection algorithm is applied with the detection area to which the protection detection algorithm is applied.

Fifth Modification Example

Figure 10A:
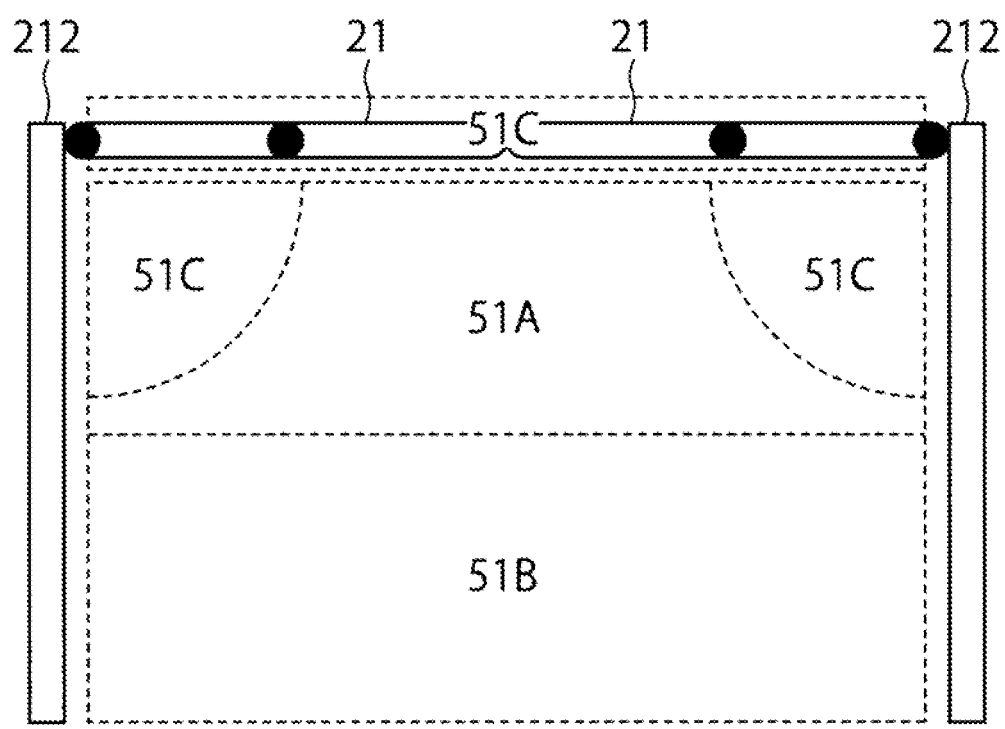
FIG. 10a is a plan view showing a detection area of an automatic door sensor according to a fifth modification example of the embodiment when the doors are fully closed.
Figure 10B:
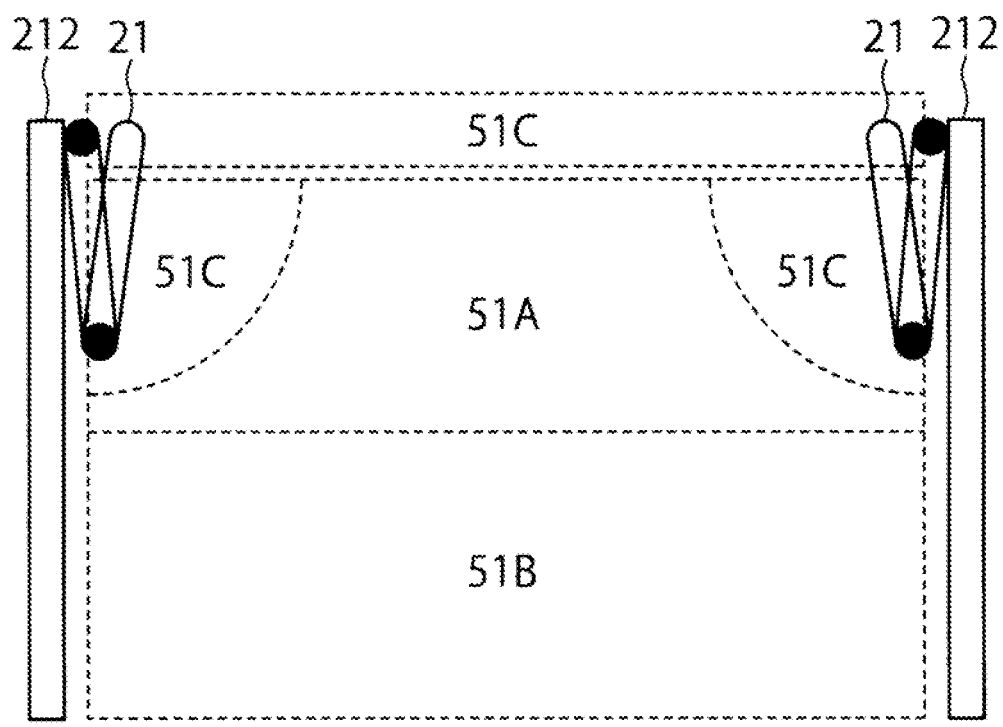
FIG. 10b is a plan view showing a detection area of the automatic door sensor according to the fifth modification example of the embodiment when the doors are fully opened.

A more specific application example of the special detection area and the activation detection area to a folding door will be described. FIG. 10a is a plan view showing a detection area of the folding door when the door is fully closed as the detection area of the automatic door sensor according to a fifth modification example. FIG. 10b is a plan view showing a detection area of the folding door when the door is fully opened as the detection area of the automatic door sensor according to the fifth modification example.

As shown in FIG. 10a, the sensor control unit 32 (see FIG. 1 and the like) has two special detection area 51C that have a substantially fan-like shape and situated on a track of each leaf of the folding door 21 pivotally supported by left and right side walls 212. In addition, the sensor control unit 32 has the special detection area 51A between the two second special detection areas 51 in front of the door 21. Further, the sensor control unit 32 has the activation detection area 51B at a position further from the door 21 than the special detection area 51A.

In the fifth modification example, when the door is fully closed, the sensor control unit 32 performs detection in accordance with the doorway detection algorithm and the opening protection detection algorithm in the second special detection areas 51C shown in FIG. 10a. The sensor control unit 32 performs detection in accordance with the activation detection algorithm and the opening protection detection algorithm in the special detection area 51A shown in FIG. 10a. Here, the opening protection detection algorithm is one mode of the protection detection algorithm for detecting a person or object entering in the space between the door 21 and the fixed wall when the door 21 is opening in order to protect the person or object from collision with the door 21 such as the person is caught by the opening door 21. Moreover, the sensor control unit 32 performs detection in accordance with the activation detection algorithm in the activation detection area 51B shown in FIG. 10a.

Whereas when the door is fully opened, the sensor control unit 32 performs detection in accordance with the doorway detection algorithm and a closing protection detection algorithm in the second special detection area 51C shown in FIG. 10b. The sensor control unit 32 performs detection in accordance with the activation detection algorithm and the closing protection detection algorithm in the special detection area 51A shown in FIG. 10b. Moreover, the sensor control unit 32 performs detection in accordance with the activation detection algorithm in the activation detection area 51B shown in FIG. 10b.

According to the fifth modification example, it is also possible to achieve both the reduction of the unnecessary opening and closing operations of the folding door and the improvement of the safety. Also in the fifth modification example, since sensing is performed in the identical special detection area 51A using the activation detection algorithm and the protection detection algorithm, unlike a case where the activation detection algorithm and the protection detection algorithm each have an independent detection area and the two algorithms are independently performed for the detection area by physically different sensors, it is not necessary to align the detection area to which the activation detection algorithm is applied with the detection area to which the protection detection algorithm is applied.

Sixth Modification Example

Figure 11A:
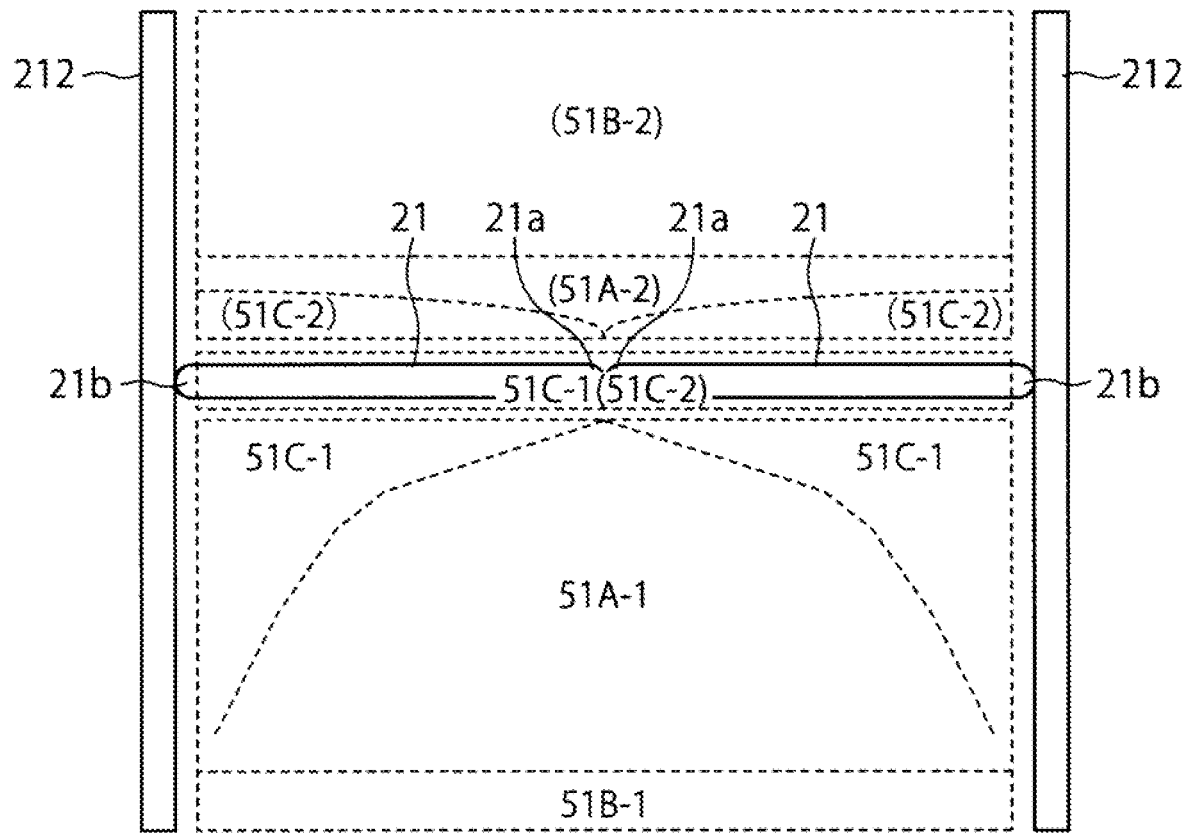
FIG. 11a is a plan view showing a detection area of an automatic door sensor according to a sixth modification example of the embodiment when the doors are fully closed.
Figure 11B:
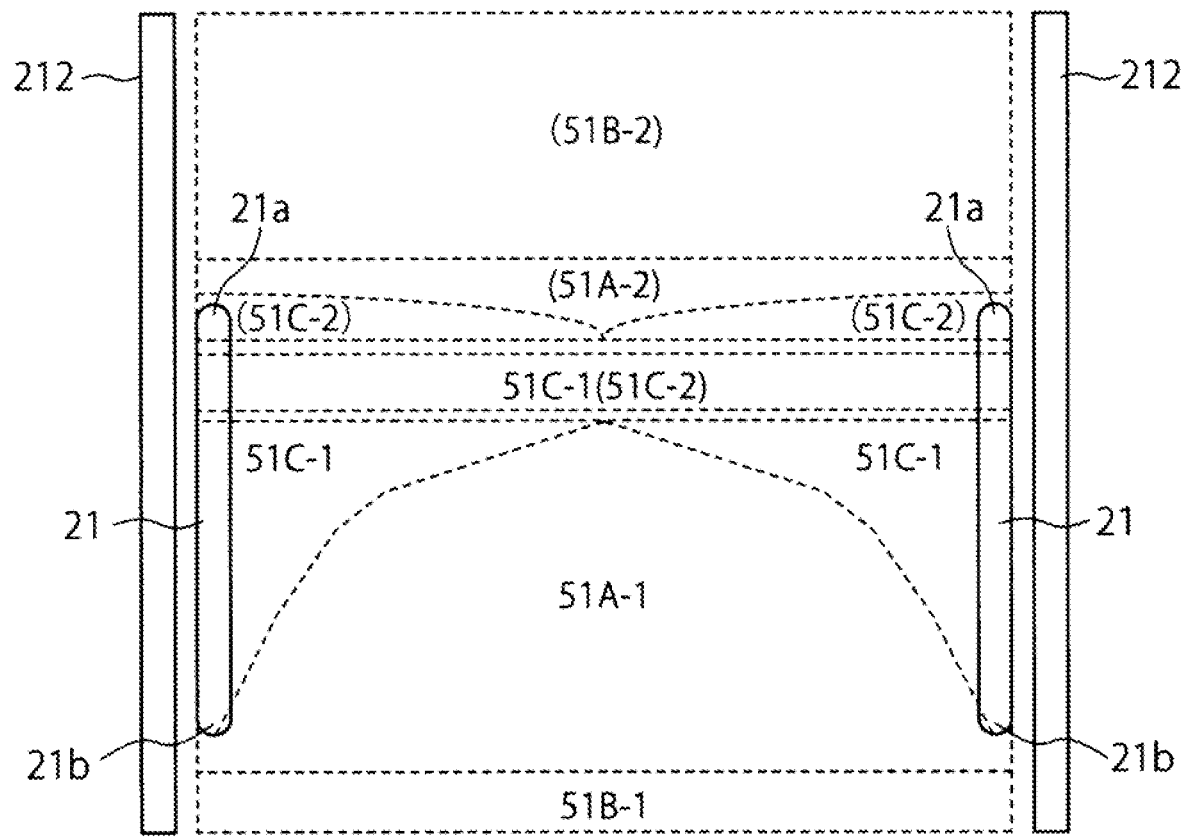
FIG. 11b is a plan view showing a detection area of the automatic door sensor according to the sixth modification example of the embodiment when the doors are fully opened.

A more specific application example of the special detection area and the activation detection area to a glide door, more commonly known as a balanced door will be described. FIG. 11a is a plan view showing a detection area of the glide door when the door is fully closed as the detection area of the automatic door sensor according to a sixth modification example. FIG. 11b is a plan view showing a detection area of the glide door when the door is fully opened as the detection area of the automatic door sensor according to the sixth modification example.

As shown in FIG. 11a, the sensor control unit 32 (see FIG. 1 and the like) has two special detection areas 51C-1, 51C-2 situated on a track of each leaf of the glide door 21. In the example of FIG. 11a, when the door is opened, the door is moved such that a leading edge 21a protrudes rearward (upward in FIG. 11a) and a trailing edge 21b protrudes forward (downward in FIG. 11a) with reference to the fully closed position of the door 21. Therefore, the second special detection areas 51C, 51C-1 and 51C-2 include the second special detection area 51C situated on the fully closed position of the door 21, the second special detection area 51C-1 situated on the front side of the door, and the second special detection area 51C-2 situated on the rear side of the door. In addition, the sensor control unit 32 has a front-side special detection area 51A-1 between the two second special detection areas 51C-1 on the front side of the door 21. Further, the sensor control unit 32 has a front-side activation detection area 51B-1 at a position further from the door 21 than the front-side special detection area 51A-1 toward the front side. Moreover, the sensor control unit 32 has a rear-side special detection area 51A-2 on the rear of the two rear-side second special detection areas 51C-2. Further, the sensor control unit 32 has a rear-side activation detection area 51B-2 at a position further from the door 21 than the rear-side special detection area 51A-2 toward the rear side.

In the sixth modification example, when the door is fully closed, the sensor control unit 32 performs detection in accordance with the doorway detection algorithm and the opening protection detection algorithm in the second special detection areas 51C, 51C-1, and 51C-2 shown in FIG. 11a. The sensor control unit 32 performs detection in accordance with the activation detection algorithm and the opening protection detection algorithm in the special detection areas 51A-1 and 51A-2 shown in FIG. 11a. Moreover, the sensor control unit 32 performs detection in accordance with the activation detection algorithm in the activation detection areas 51B-1 and 51B-2 shown in FIG. 11a.

Whereas when the door is fully opened, the sensor control unit 32 performs detection in accordance with the doorway detection algorithm and the closing protection detection algorithm in the second special detection areas 51C, 51C-1, and 51C-2 shown in FIG. 11b. The sensor control unit 32 performs detection in accordance with the activation detection algorithm and the closing protection detection algorithm in the special detection areas 51A-1 and 51A-2 shown in FIG. 11b. Moreover, the sensor control unit 32 performs detection in accordance with the activation detection algorithm in the activation detection areas 51B-1 and 51B-2 shown in FIG. 11b.

According to the sixth modification example, it is also possible to achieve both the reduction of the unnecessary opening and closing operations of the glide door and the improvement of the safety. Similarly to the special detection area 51A-1, since sensing is performed in the identical special detection area 51A-2 using the activation detection algorithm and the protection detection algorithm, unlike a case where the activation detection algorithm and the protection detection algorithm each have an independent detection area and the two algorithms are independently performed for the detection area by physically different sensors, it is not necessary to align the detection area to which the activation detection algorithm is applied with the detection area to which the protection detection algorithm is applied.

Seventh Modification Example

Figure 12A:
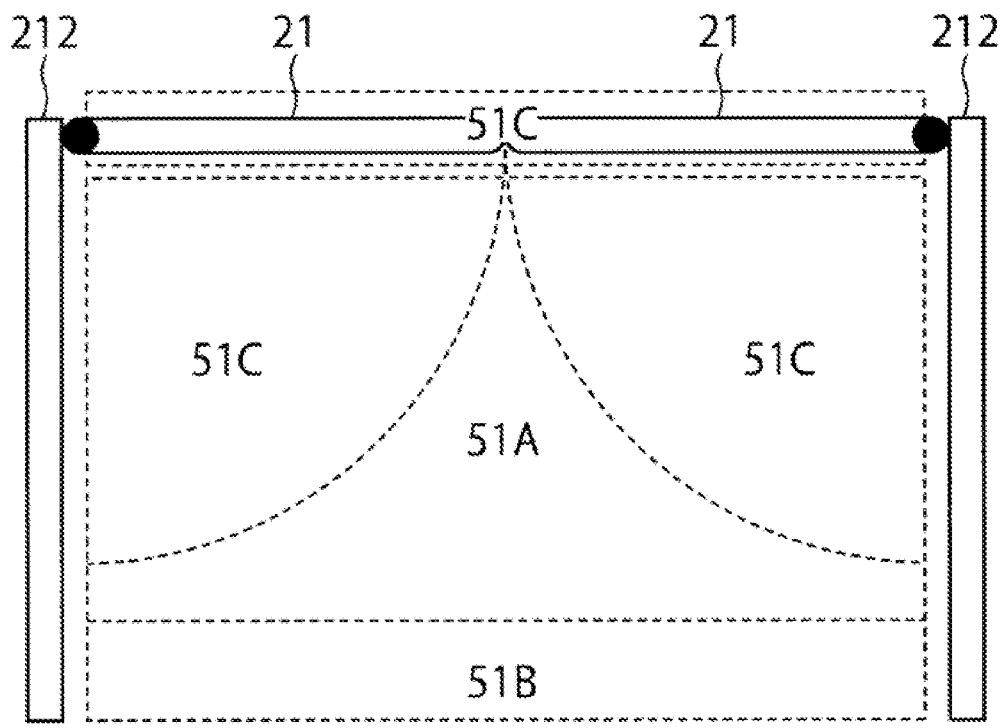
FIG. 12a is a plan view showing a detection area of an automatic door sensor according to a seventh modification example of the embodiment when the doors are fully closed.
Figure 12B:
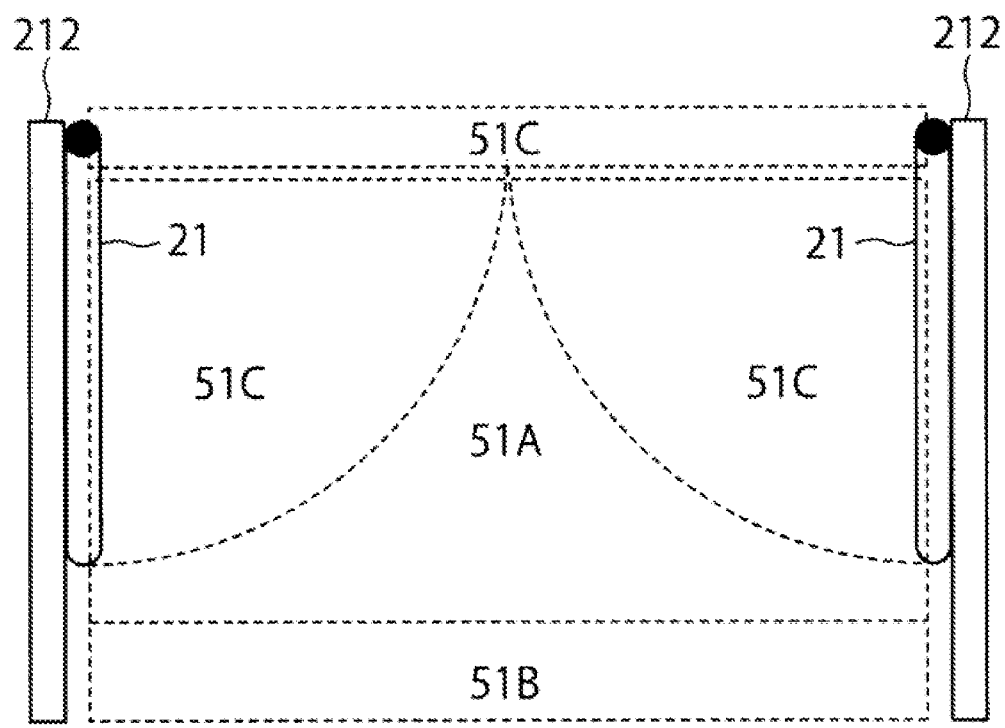
FIG. 12b is a plan view showing a detection area of the automatic door sensor according to the seventh modification example of the embodiment when the doors are fully opened.

A more specific application example of the special detection area and the activation detection area to a hinged door will be described. FIG. 12a is a plan view showing a detection area of the hinged door when the door is fully closed as the detection area of the automatic door sensor according to the seventh modification example. FIG. 12b is a plan view showing a detection area of the hinged door when the door is fully opened as the detection area of the automatic door sensor according to the seventh modification example.

As shown in FIG. 12a, the sensor control unit 32 (see FIG. 1 and the like) has the two special detection area 51C that have a substantially fan-like shape and situated on a track of each leaf of the hinged door 21 pivotally supported by left and right side walls 212. In addition, the sensor control unit 32 has the special detection area 51A between the two second special detection areas 51 in front of the door 21. Further, the sensor control unit 32 has the activation detection area 51B at a position further from the door 21 than the special detection area 51A.

In the seventh modification example, when the door is fully closed, the sensor control unit 32 performs detection in accordance with the doorway detection algorithm and the opening protection detection algorithm in the second special detection areas 51C shown in FIG. 12a. The sensor control unit 32 performs detection in accordance with the activation detection algorithm and the opening protection detection algorithm in the special detection area 51A shown in FIG. 12a. Moreover, the sensor control unit 32 performs detection in accordance with the activation detection algorithm in the activation detection area 51B shown in FIG. 12A.

Whereas when the door is fully opened, the sensor control unit 32 performs detection in accordance with the doorway detection algorithm and a closing protection detection algorithm in the second special detection area 51C shown in FIG. 12b. The sensor control unit 32 performs detection in accordance with the activation detection algorithm and the closing protection detection algorithm in the special detection area 51A shown in FIG. 12b. Moreover, the sensor control unit 32 performs detection in accordance with the activation detection algorithm in the activation detection area 51B shown in FIG. 12b.

According to the seventh modification example, it is also possible to achieve both the reduction of the unnecessary opening and closing operations of the hinged door and the improvement of the safety. Also in the seventh modification example, since sensing is performed in the identical special detection area 51A using the activation detection algorithm and the protection detection algorithm, unlike a case where the activation detection algorithm and the protection detection algorithm each have an independent detection area and the two algorithms are independently performed for the detection area by physically different sensors, it is not necessary to align the detection area to which the activation detection algorithm is applied with the detection area to which the protection detection algorithm is applied.

Eighth Modification Example

Figure 13A:
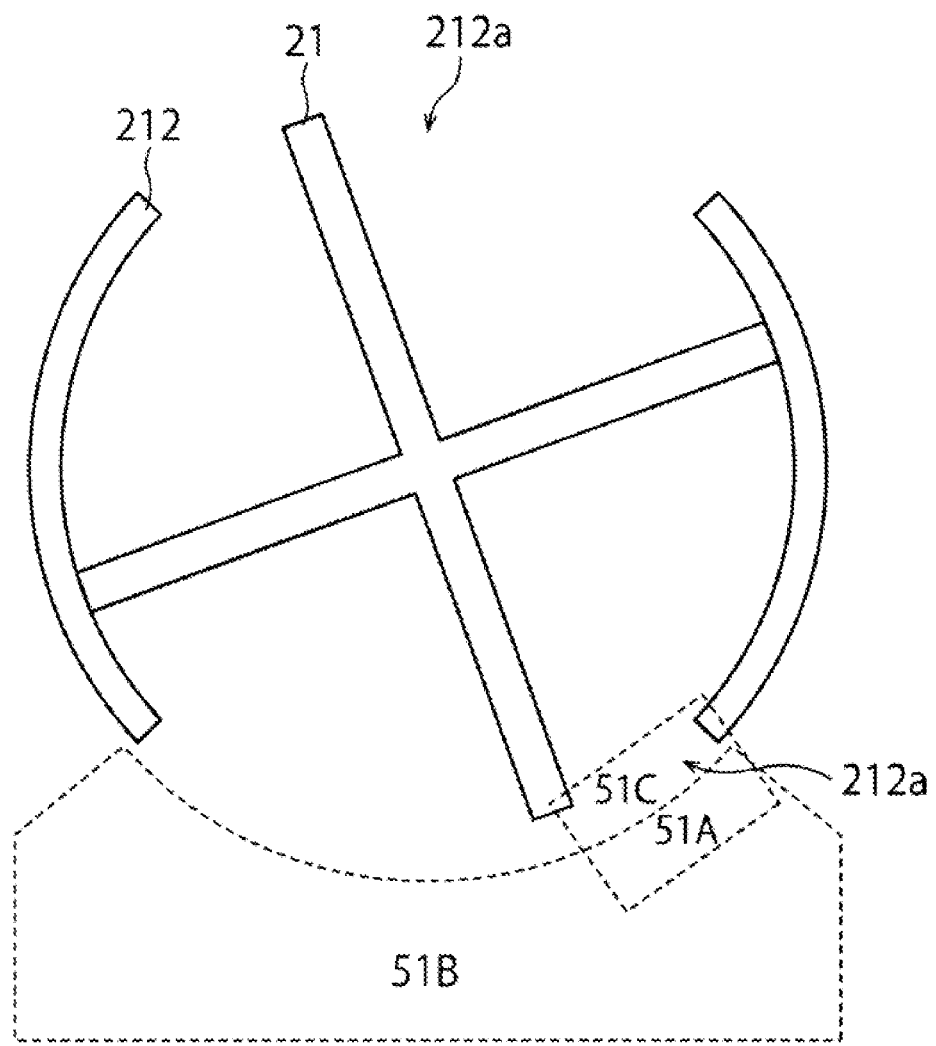
FIG. 13a is a plan view showing a detection area of an automatic door sensor according to an eighth modification example of the embodiment when something is caught by the doors.
Figure 13B:
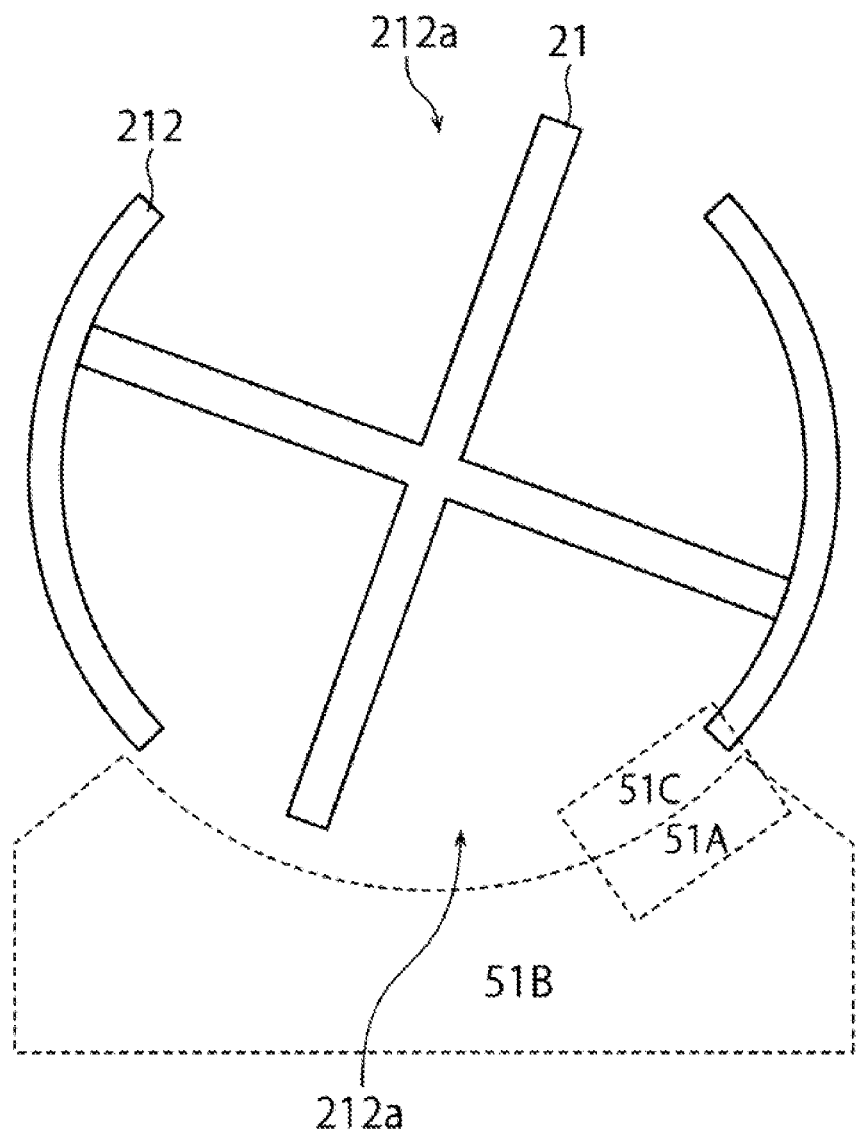
FIG. 13b is a plan view showing a detection area of the automatic door sensor according to the eighth modification example of the embodiment when a person is passing through the doors.

A more specific application example of the special detection area and the activation detection area to a rotating door will be described. FIG. 13a is a plan view showing a detection area of the rotating door when the door is closed as the detection area of the automatic door sensor according to the eighth modification example. FIG. 13b is a plan view showing a detection area of the rotating door when the door is opened to allow a person to enter or exit as the detection area of the automatic door sensor according to the eighth modification example.

As shown in FIG. 13a, the sensor control unit 32 (see FIG. 1 and the like) has the second special detection area 51C on a track of the rotating door 21 that revolves inside a cylindrical casing 212 provided with an entrance and exit 212a. In addition, the sensor control unit 32 has the special detection area 51A outside the entrance and exit 212a adjacent to the second special detection area 51C. Further, the sensor control unit 32 has the activation detection area 51B at a position further on the outer side from the door 21 than the special detection area 51A.

In the eighth modification example, when the door is closed, the sensor control unit 32 performs detection in accordance with the doorway detection algorithm and a door catching protection detection algorithm in the second special detection area 51C shown in FIG. 13a. Here, the door catching protection detection algorithm is one mode of the protection detection algorithm for detecting a person or object entering in the rotating door 21 in order to protect the person or object from collision with the door 21 such as the person is caught by the rotating door 21. The sensor control unit 32 performs detection in accordance with the activation detection algorithm and the door catching protection detection algorithm in the special detection area 51A shown in FIG. 13a. Moreover, the sensor control unit 32 performs detection in accordance with the activation detection algorithm in the activation detection area 51B shown in FIG. 13a.

Whereas when a person is about to walking through the door, the sensor control unit 32 performs detection in accordance with the doorway detection algorithm and in the second special detection area 51C shown in FIG. 13b. Moreover, the sensor control unit 32 performs detection in accordance with the activation detection algorithm in the special detection area 51A and the activation detection area 51B shown in FIG. 13b.

According to the eighth modification example, it is also possible to achieve both the reduction of the unnecessary opening and closing operations of the rotating door and the improvement of the safety. Also in the eighth modification example, since sensing is performed in the identical special detection area 51A using the activation detection algorithm and the protection detection algorithm, unlike a case where the activation detection algorithm and the protection detection algorithm each have an independent detection area and the two algorithms are independently performed for the detection area by physically different sensors, it is not necessary to align the detection area to which the activation detection algorithm is applied with the detection area to which the protection detection algorithm is applied.

The automatic door sensor 3 may use an ultrasonic wave or a distance measurement sensor instead of the infrared light, the image and the radio wave described above.

Aspects of the invention are not limited to the individual embodiments described above. For example, instead of using the activation detection algorithm as the activation detection means and the protection detection algorithm as the protection detection means, an activation sensor device and a protection sensor device that are physically separate but have overlapping detection areas may be used. In this case, the activation sensor device has a person or object detection function equivalent to the activation detection algorithm, and is, for example, a far-infrared sensor device. The protection sensor device has a person or object detection function equivalent to the protection detection algorithm, and is, for example, a near-infrared sensor device. The activation sensor device may be a radio wave type sensor device, and the protection sensor device may be a near infrared type sensor device.

An automatic door system according to an embodiment of the invention will now be described with reference to the appended drawings. Embodiments described below are each one example of an embodiment of the invention, and the invention is not intended to be construed as being limited thereto. Furthermore, in the drawings referred to in this embodiment, the same parts or parts having similar functions are denoted by the same or like reference characters, and duplicate descriptions thereof are omitted. Furthermore, for the sake of convenience of description, a dimensional ratio of the drawings is possibly different from an actual dimensional ratio, and some elements of a configuration are possibly omitted from the drawings.

Figure 14:
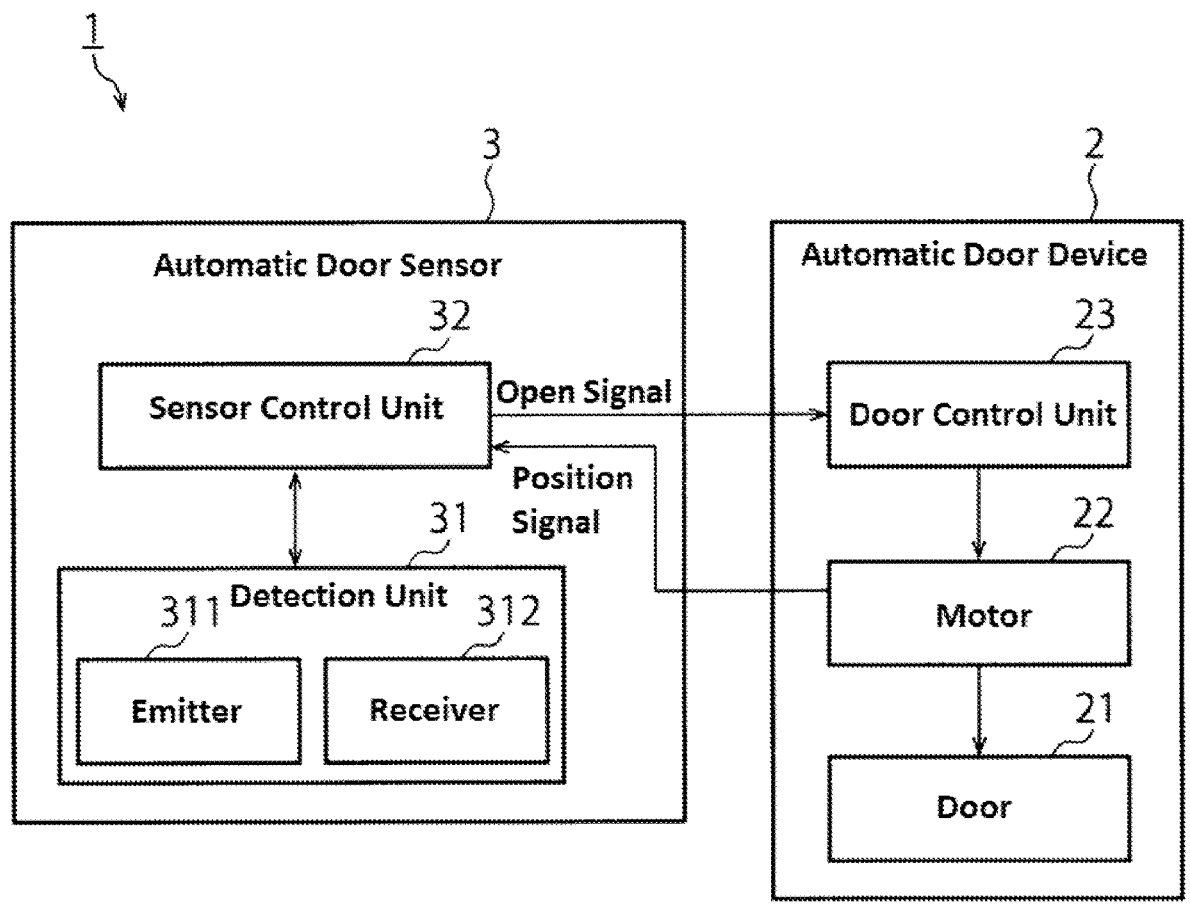
FIG. 14 is a block diagram illustrating an automatic door system according to one embodiment.

FIG. 14 illustrates the automatic door system 1 according to one embodiment. FIG. 2 referred above is a bird's-eye view of the automatic door system 1 according to the embodiment. Referring to FIG. 14, the automatic door system 1 includes the automatic door device 2 and the door sensor 3. In the automatic door system 1, the automatic door sensor 3 detects a person who try to pass through the door 21 shown in FIG. 2 and causes the door 21 to be opened to let the person walk therethrough in accordance with a detection result of the automatic door sensor 3.

Automatic Door Device 2

The automatic door device 2 includes the door 21, the motor 22, and the door control unit 23 which is an example of the door control means. The motor 22 is supplied with power from a power supply (not shown) to generate a rotational force used to automatically open and close the door 21. The rotational force of the motor 22 is transmitted to the door 21 as a translational force in the opening-closing direction d1 shown in FIG. 2 via power transmission members such as a pulley and a timing belt (not shown). In the example illustrated in FIG. 2, the door 21 is a double-leaf sliding door that is drawn apart to be opened. The type of the door 21 is not limited to the example shown in FIG. 2. Any type of door may be adopted such as a single sliding door, a hinged door, a folding door, and a glide door.

The door control unit 23 is connected to the motor 22 and the automatic door sensor 3. The door control unit 23 performs a drive control of the motor 22 by controlling power supply based on signals or information acquired from the automatic door sensor 3 and the motor 22. By performing the drive control of the motor 22, the door control unit 23 controls driving for operation of the door 21. The drive control of the motor 22 is at least one or a combination of two or more of application/non-application of driving of the motor 22, a drive speed, a drive torque, and a rotation direction.

For example, the automatic door sensor 3 supplies an open signal corresponding to detection of a person or object in an effective detection area, which will be described later, to the door control unit 23. In response to reception of the open signal, the door control unit 23 performs a control (hereinafter, also referred to as an open drive control) of driving the door 21 in the opening direction.

Automatic Door Sensor 3

As shown in FIG. 2, the automatic door sensor 3 is provided on the transom bar 24 at the middle position thereof, more specifically, above the boundary between the two leaves of the closed door 21 in order to detect a person and the like approaching the door 21. The automatic door sensor 3 may be provided at a place other than the transom bar 24 such as a ceiling.

As shown in FIG. 14, the automatic door sensor 3 includes the detection unit 31 and the sensor control unit 32. The detection unit 31 and the sensor control unit 32 are an example of the detection unit. The sensor control unit 32 is connected to the detection unit 31 and the door control unit 23. The sensor control unit 32 includes hardware such as a CPU, a ROM, and a RAM. Software may be used to realize at least a part of the sensor control unit 32. The detection unit 31 includes the emitter 311 and the receiver 312.

The sensor control unit 32 has an effective detection area. As shown in FIG. 2, the effective detection area is set in at least a part of a detection area 5 that is an area of the floor detectable by the automatic door sensor 3 for detection of a person and the like approaching the door 21.

The emitter 311 includes a plurality of light emitting elements (not shown). The emitter 311 irradiates or emits near infrared light in a pulse form to the detection area 5 from each of the plurality of light emitting elements. The receiver 312 includes a plurality of light receiving elements (not shown) optically corresponding to the plurality of light emitting elements of the emitter 311. The receiver 312 receives the near infrared light that is irradiated onto the detection area 5 from each of the plurality of light emitting elements in the emitter 311 by the corresponding light receiving elements, and senses the amount of the near infrared light received by each light receiving element. The receiver 312 outputs the sensed amount of the light to the sensor control unit 32 as a sensing signal having a signal value corresponding to the amount of light received. Alternatively, the emitter 311 and the receiver 312 may emit and receive light other than the near infrared light.

In the example of FIG. 2, the detection area 5 includes a plurality of small detection areas 51 arranged at intervals in the open-close direction d1 of the door 21 and the front-back direction d2 orthogonal to the open-close direction 21 at the front of the double-leaf sliding door 21. Specifically, there are a total of 72 small detection areas 51, which is calculated as six columns×12, as shown in FIG. 2.

Each small detection area 51 corresponds to an irradiation spot of near-infrared light that is emitted from the corresponding one of the plurality of light emitting elements in the emitter 311 and is respectively received by the corresponding one of the plurality of light receiving elements in the receiver 312.

The effective detection area in the example of FIG. 2 includes at least one small detection area 51 among the plurality of small detection areas 51. In the example of FIG. 2, each small detection area 51 has a circular shape. In this case, the diameter of the small detection area 51 at the floor surface 6 may have, for example, any value between 10 cm and 30 cm. The small detection area 51 may have a shape other than a circular shape such as an elliptical shape, a rectangular shape, and a polygonal shape.

How to determine which small detection area 51 among the plurality of small detection areas 51 is to be set as the effective detection area is not particularly limited. For example, the effective detection area may be predetermined before the start of use of the automatic door system 1. Further, the effective detection area may be variable depending on the door position or the like.

The sensor control unit 32 causes all the light emitting elements in the emitter 311 to emit near infrared light toward the corresponding small detection areas 51. The sensor control unit 32 subsequently causes all the light receiving elements in the receiver 312 to receive reflected light of the near infrared light from the corresponding small detection areas 51. Then, the sensor control unit 32 selects a sensing signal of the effective detection area from among the sensing signals of the small detection areas 51 supplied from the receiver 312.

Based on the selected sensing signal of the effective detection area, the sensor control unit 32 detects a person and the like in accordance with an activation detection algorithm or a protection detection algorithm which will be described later. In the detection of a person or object approaching, the sensor control unit 32 stores, for example, a signal value (that is, the amount of light received) of the sensing signal of the effective detection area immediately after power on of the automatic door system 1 as a reference value. The sensor control unit 32 may detect a person or object based on a variation of the signal value relative to the reference value. When a person situated in the effective detection area is detected, the sensor control unit 32 outputs the open signal to the automatic door control unit 23. In this way, the detection result in the effective detection area is used for a drive control to open the door 21.

Further, the sensor control unit 32 acquires a position signal indicating the position of the door 21 from the motor 22. Based on the acquired position signal, the sensor control unit 32 switches between the detection algorithm applied to a special detection area 51A which will be described later between the activation detection algorithm and the protection detection algorithm. A specific example of the position signal is not particularly limited as long as the position of the door 21 is detectable with the signal. For example, the position signal is generated based on the phase of a Hall element of the motor 22. The position signal may be a signal based on a rotary encoder that detects the revolution of the motor 22 or based on a linear encoder that detects the open and close positions of the door 21. Furthermore, the position signal may be acquired from the door control unit instead of directly acquiring from the motor 22.

The sensor control unit 32 may cause only the light emitting element(s) corresponding to the effective detection area to emit the near infrared light, instead of causing all the light emitting elements in the emitter 311 to emit the near infrared light. In this case, all the small detection areas 51 to which the near infrared light is irradiated become the effective detection area. By causing only the light emitting element(s) corresponding to the effective detection area to emit the near infrared light, it is possible to reduce power consumption. In addition, it is also possible to extend the life of the light emitting elements.

Alternatively, the effective detection area may be set in the door control unit 23, and the door control unit 23 may function as the detection means. In this case, the sensor control unit 32 may output the sensing signals of all the small detection areas 51 supplied from the light receiving unit 312 to the door control unit 23. The door control unit 23 may perform detection of a person approaching and the like in accordance with the activation detection algorithm or the protection detection algorithm, which will be described later, based on the sensing signal of the effective detection area(s) predetermined in advance among the sensing signals of all the small detection areas 51 supplied from the sensor control unit 32.

Detection Algorithms Applied to Detection Area 5

As shown in FIG. 2, the sensor control unit 32 has the special detection area 51A (special detection area) as a part of the plurality of small detection areas 51 forming the detection area 5. When the door 21 is in the closed position, detection in accordance with the activation detection algorithm is performed in the special detection area 51A to detect a person or an object, and the detection result by the activation detection algorithm is used for the drive control of the door 21. Moreover, when the door 21 is in a position other than the closed position, detection in accordance with the protection detection algorithm in which the detection sensitivity for a person or an object is higher than the activation detection algorithm is performed in the special detection area 51A, and the detection result by the protection detection algorithm is used for the drive control of the door 21 instead of the detection result by the activation detection algorithm.

The activation detection algorithm is, for example, a detection algorithm for detecting a person or object approaching and opening (that is, activating) the door 21. The activation detection algorithm focuses on reducing the malfunction of the door 21 due to false detection of the automatic door sensor 3 stemming from influences of the structure of the automatic door system 1 and the installation environment of the automatic door system 1. The activation detection algorithm uses a process in which the sensitivity of the automatic door sensor 3 is relatively low. Specifically, as a reference value or algorithm for determining that a person or object is present from the signal value (physical value) detected by the automatic door sensor 3, the activation detection algorithm uses one that is relatively insensitive so that it less frequently determines that the person or object is present. As such an algorithm, there are one that prevents false detection due to snowfall, and one that prevents false detection due to an insect flying around the automatic door sensor 3. The activation detection algorithm is suitable for reducing unnecessary opening and closing operations of the door 21. In the embodiment, an activation detection means includes the detection unit 31 and the sensor control unit 32 that executes the activation detection algorithm.

The protection detection algorithm is a detection algorithm focusing on detecting, for example, a person stopping near the door 21 or an object present in the vicinity of the door 21 in order to protect the person or object from collision with the door 21, for example, to prevent the person or object from being caught in the closing door 21. The protection detection algorithm uses a process in which the sensitivity of the automatic door sensor 3 is relatively high. Specifically, as a reference value or algorithm for determining that a person or object is present from a signal value (physical value) detected by the automatic door sensor 3, the protection detection algorithm uses one that is relatively sensitive so that it tends to easily determine that the person or object is present. The protection detection algorithm is suitable for safety improvement. In the embodiment, the protection detection means includes the detection unit 31 and the sensor control unit 32 that executes the protection detection algorithm.

The activation detection algorithm and the protection detection algorithm are stored in the sensor control unit 32 that performs detection of an person approaching.

The sensor control unit 32 performs detection in accordance with at least one of the activation detection algorithm and the protection detection algorithm in the special detection area 51A, and the detection result in accordance with the activation detection algorithm or the protection detection algorithm selected depending on the open or closed state of the door 21 is used for the drive control of the door 21.

More specifically, when the door 21 is in the closed position, the sensor control unit 32 performs detection in accordance with only the activation detection algorithm in the special detection area 51A set in the effective detection area. Whereas when the door 21 is in a position other than the closed position, the detection method may be switched to detection in accordance with only the protection detection algorithm in the same special detection area 51A.

In this case, when the door 21 is in the closed position, the sensor control unit 32 supplies the open signal to the door control unit 23 based on the result of detection performed in the special detection area 51A in accordance with the activation detection algorithm. The door control unit 23 drives and controls the door 21 based on the detection result performed in accordance with the activation detection algorithm. When the door 21 is in the closed position, the sensor control unit 32 supplies the open signal to the door control unit 23 based on the result of detection performed in the special detection area 51A in accordance with the protection detection algorithm. The door control unit 23 drives and controls the door 21 based on the result of detection performed in accordance with the protection detection algorithm. For example, when the door 21 performs the closing operation from the fully opened state and the protection detection algorithm detects a person approaching in the special detection area 51A, the sensor control unit 32 outputs the open signal to the closing door 21 to prevent the person from being caught by the door 21. Alternatively, when the door 21 performs the closing operation and the protection detection algorithm detects a person approaching in the special detection area 51A, the sensor control unit 32 may stop supplying a close signal (in other words, stops the closing operation of the door 21) to prevent the person from being caught by the door 21.

Alternatively, when the door 21 is in the closed position, the sensor control unit 32 may perform detections in accordance with both the activation and protection detection algorithms in the special detection area 51A set in the effective detection area, and may then output only the result of the detection in accordance with the activation detection algorithm to the door control unit 23. The door control unit 23 performs the drive control of the door 21 based on this result of the detection. When the door 21 is in a position other than the closed position, the sensor control unit 32 may perform detections in accordance with both the activation and protection detection algorithms in the same special detection area 51A as the detection area when the door 21 is in the closed position, and may then output only the result of the detection in accordance with the protection detection algorithm to the door control unit 23. The door control unit 23 performs the drive control of the door 21 based on this result of the detection.

When detection of a person approaching is performed by the door control unit 23, the activation detection algorithm and the protection detection algorithm may be stored in the door control unit 23. In this case, when the door 21 is in the closed position, the door control unit 23 performs detection in the special detection area 51A set in the effective detection area in accordance with the activation detection algorithm to detect a person approaching and the like, and performs the drive control to open the door 21 based on the result of the detection of the person and the like. Moreover, when the door 21 is in a position other than the closed position, the sensor control unit 32 performs detection in the special detection area 51A set in the effective detection area in accordance with the protection detection algorithm to detect a person and the like, and performs the drive control to open the door 21 based on the result of the detection of the person and the like.

By providing the special detection area 51A, when the door 21 is closed, the result of the detection in accordance with the activation detection algorithm in which the sensitivity of the sensor 3 is reduced may be used for the drive control of the door 21, whereas when the door 21 is opened, the result of the detection in accordance with the protection detection algorithm in which the sensitivity of the sensor 3 is increased may be used for the drive control of the door 21. In this way, it is possible to achieve both the reduction of the unnecessary opening and closing operations of the door 21 and the improvement of the safety.

The standard requires that the detection area to which the protection detection algorithm is applied be situated within 200 mm from the door 21. Thus, the special detection area 51A is set as a small detection area 51A situated at the second and third rows of the small detection areas counting from the row closest to the door 21 as shown in FIG. 2. When the small detection area 51A situated at the second and third rows is set as the special detection area 51A, the standard can be satisfied, and the safety in the vicinity of the door 21 can be further improved. The number of rows of the small detection areas that are set as the special detection area 51A can be changed depending on the size of each small detection area 51.

Further, as shown in FIG. 2, the sensor control unit 32 may further has a small detection area 51B that is different from the special detection area 51A and set in the area of the plurality of small detection areas 51. Only a detection in accordance with the activation detection algorithm is performed in the small detection area 51B. The activation detection area 51B may be an area where detections in accordance with both the activation detection algorithm and the protection detection algorithm may be performed, and only the result of the detection in accordance with the activation detection algorithm may be used for the drive control of the door 21. The special detection area 51A may be disposed closer to the door 21 than the activation detection area 51B. In the example of FIG. 2, the activation detection area 51B is the small detection area 51B situated at the fourth to sixth columns. By setting the activation detection area 51B at a position distant from the door 21 where chances of false detection caused by a person standing, stopped walking or the like are small, it is possible to effectively reduce false detections in the detection area 5 away from the door 21.

In the small detection area 51C at the first row may be an area where detection in accordance with only the activation detection algorithm is performed when the door 5 is in the closed position, whereas when the door 5 is open, the area is invalidated in order to prevent false detections such as detecting the door 5 as a person approaching. Here, "invalid" or "invalidated" encompass meaning that the sensing signal is not treated as a valid signal even if the detection is properly performed, and meaning that the detection operation is stopped so that the detection is not performed (the same applies hereinafter).

Further, the sensor control unit 32 may further has a protection detection area where detection in accordance with only the protection detection algorithm is performed as another small detection area 51 other than the special detection area 51A and the activation detection area 51B among the plurality of small detection areas 51. For example, the small detection area 51C at the first row may be used as the protection detection area. Even when the small detection area 51C at the first row is set as the protection detection area, in order to prevent false detections as the sensor detects the door 21 as a person approaching and the like, small detection area(s) 51 corresponding to the positions where the door 21 is situated may be invalidated while the door 21 is moving. Alternatively the sensitivity of the detection for such a small detection area(s) may be lowered than the activation detection area 51B (so that the false detection due to the door 21 is unlikely occurred). This detection algorithm in the embodiment is herein referred to as a doorway detection algorithm. In this case, the special detection area 51C serves as the second special detection area, and the detection unit 31 and the sensor control unit 32 executing the doorway detection algorithm serve as the doorway detection means. In the case where the small detection area 51C at the first row is used as the protection detection area, the special detection area 51A is disposed between the activation detection area 51B and the protection detection area 51C. In this case, according to the switching of the detection algorithm applied to the special detection area 51A, it is possible to expand the small detection area(s) 51 where the detection by the activation detection algorithm is performed or the small detection area(s) 51 where the detection by the protection detection algorithm is performed In this way, it is possible to achieve both the reduction of the unnecessary opening and closing operations of the door 21 and the improvement of the safety more effectively.

FIG. 15 is a conceptual diagram showing the detection algorithm used in the automatic door system 1 according to the embodiment. As shown in FIG. 15, in the detection in accordance with the protection detection algorithm, the stationary object detection time, which is time from when a person or object is detected to when the detected person or object is determined as the stationary object (that is, the background) and excluded from the detection target, may be longer than the stationary object detection time in the detection in accordance with the activation detection algorithm. A specific example of the stationary object detection time is not particularly limited. For example, the stationary object detection time in the activation detection algorithm may be five seconds, and the stationary object detection time in the protection detection algorithm may be 30 seconds. By making the stationary object detection time in the protection detection algorithm longer than the stationary object detection time in the activation detection algorithm, it becomes possible to detect a person standing by the door for a long time when the door 21 is opened. In this way, the safety is improved. Moreover, since the influence of a disturbance can be suppressed when the door 21 is closed, it is possible to prevent unnecessary opening and closing operations of the door 21.

As shown in FIG. 15, the activation detection algorithm is an algorithm using a temporal filter known in the field of signal processing, and may have a first mode for detecting a person or an object. In this case, the protection detection algorithm does not have the first mode. The first mode is a mode in which the sensitivity of the automatic door sensor 3 is reduced in the time base. Since the activation detection algorithm has the first mode and the protection detection algorithm does not have the first mode, the safety deterioration and the unnecessary opening and closing operations of the door 21 can be prevented under the situation where there is a fluctuation in time.

As shown in FIG. 15, the activation detection algorithm may be an algorithm using a spatial filter known in the field of signal processing, and may have a second mode for detecting a person or an object. In this case, the protection detection algorithm does not have the second mode. The second mode is a mode in which the sensitivity of the automatic door sensor 3 is reduced in the space base. Since the activation detection algorithm has the second mode and the protection detection algorithm does not have the second mode, the safety deterioration and the unnecessary opening and closing operations of the door 21 can be prevented under the situation where there is a fluctuation in space.

Moreover, as shown in FIG. 15, the activation detection algorithm may have a third mode in which a condition to be determined that a person or object is detected is that a change is equal to or greater than a threshold set higher than a predetermined threshold for detecting the person or object. In this case, the protection detection algorithm does not have the third mode. The third mode is a mode in which the originally set value of the detection sensitivity of the automatic door sensor 3 is uniformly reduced. Since the activation detection algorithm has the third mode and the protection detection algorithm does not have the third mode, it is possible to prevent the safety deterioration and the unnecessary opening and closing operations of the door 21 due to the fluctuation in the position of the door sensor 3 attached to the door 21 caused by the movement of the door 21.

Further, the sensor control unit 32 may have an exit-side detection area (hereinafter also referred to as an exit-side activation detection area) where detection in accordance with only the activation detection algorithm is performed and another exit-side detection area (hereinafter also referred to as an exit-side protection detection area) where detection in accordance with only the protection detection algorithm is performed. In this case, the sensor control unit 32 may perform the exit invalid control that invalidates the exit detection area when the protection detection area on the exit side becomes undetected state. By performing the exit invalid control, it is possible to reducing the time length when the door 21 is opened while preventing the safety deterioration.

Further, the sensor control unit 32 may performs the traverse invalid control that invalidates the activation detection area 51B when it is detected that a person or object is moving only in a direction along the door 21 in the activation detection area 51B. The "direction along the door 21" may be the opening-closing direction d1 shown in FIG. 2 or a direction having an angle with the opening-closing direction d1 smaller than a threshold (that is, a direction almost same as the opening-closing direction d1). By performing the traverse invalid control, it is possible to more effectively prevent the unnecessary opening and closing operations of the door 21 and to prevent the safety deterioration.

The activation detection algorithm and the protection detection algorithm are not limited to one type each, and two or more types may be provided. When multiple types of the protection detection algorithm are used, such protection detection algorithms may be switched depending on the door position, the state of the door control, the control state of the sensor and the like. Alternatively two or more protection detection algorithms may be concurrently executed and then necessary one at the time may be selected from among them.

Further, the sensor control unit 32 may switch the algorithm from the activation detection algorithm to the protection detection algorithm at the timing when the door 21 begins to open, at the when the door 21 is fully opened, or at any timing between the door 21 begins to open and is fully opened.

Operation Example

Figure 16:
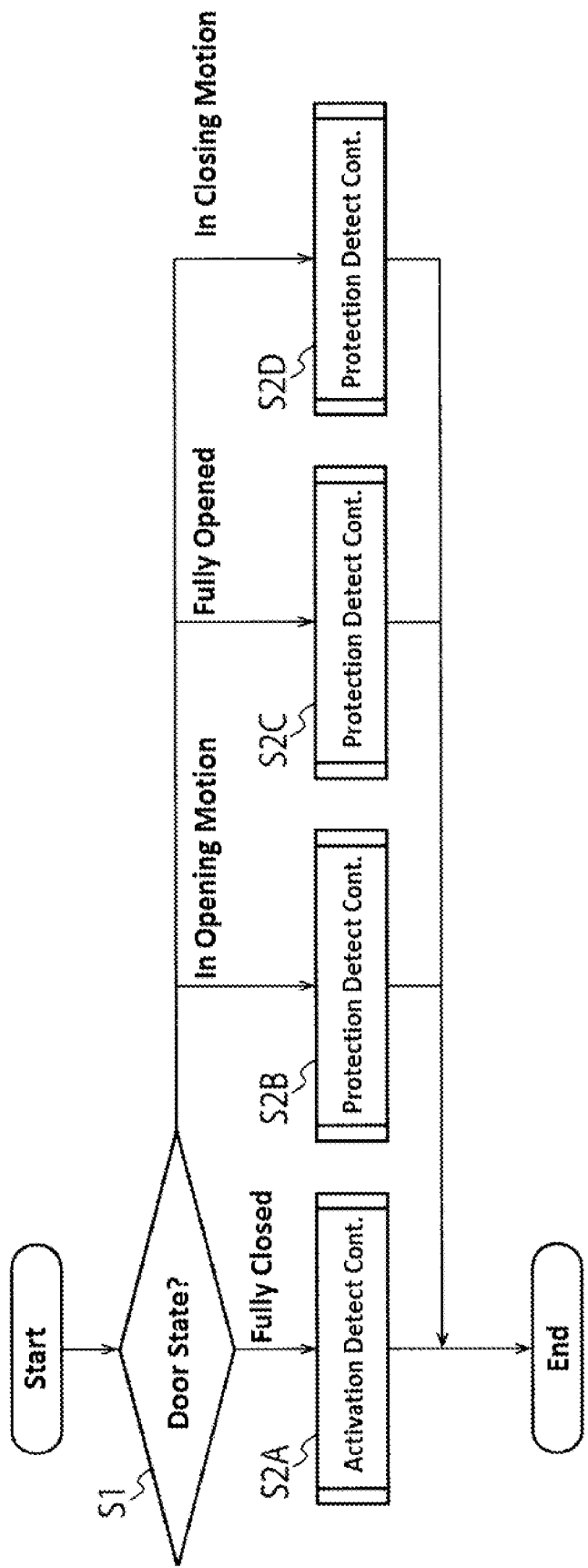
FIG. 16 is a flowchart illustrating switching of the detection algorithm depending on the status of the doors in an operation example of the automatic door system according to the embodiment.

An operation example of the automatic door system 1 will now be described. FIG. 16 is a flowchart illustrating switching of the detection algorithm depending on the status of the door in the operation example of the automatic door system 1 according to the embodiment. The process shown in the flowchart of FIG. 16 may be repeatedly carried out as necessary.

As shown in FIG. 16, first, the sensor control unit 32 determines a door status whether the door 21 is opened or closed based on the position signal supplied from the motor 22 (step S1). When the door is in the fully closed state, the sensor control unit 32 executes an activation detection control, which is an example of detection in accordance with the activation detection algorithm, in the special detection area 51A (step S2A). When the door is in opening motion, the sensor control unit 32 executes a protection detection control in the special detection area 51A (step S2B). In the activation detection area 51B, the activation detection control is always executed.

Whereas when the door 21 is in the fully open state, the sensor control unit 32 executes the protection detection control, which is an example of detection in accordance with the protection detection algorithm, in the special detection area 51A (step S2C). When the door 21 is in closing motion, the sensor control unit 32 also executes the protection detection control in the special detection area 51A (step S2D). In the protection detection area, the protection detection control is always executed.

Figure 17:
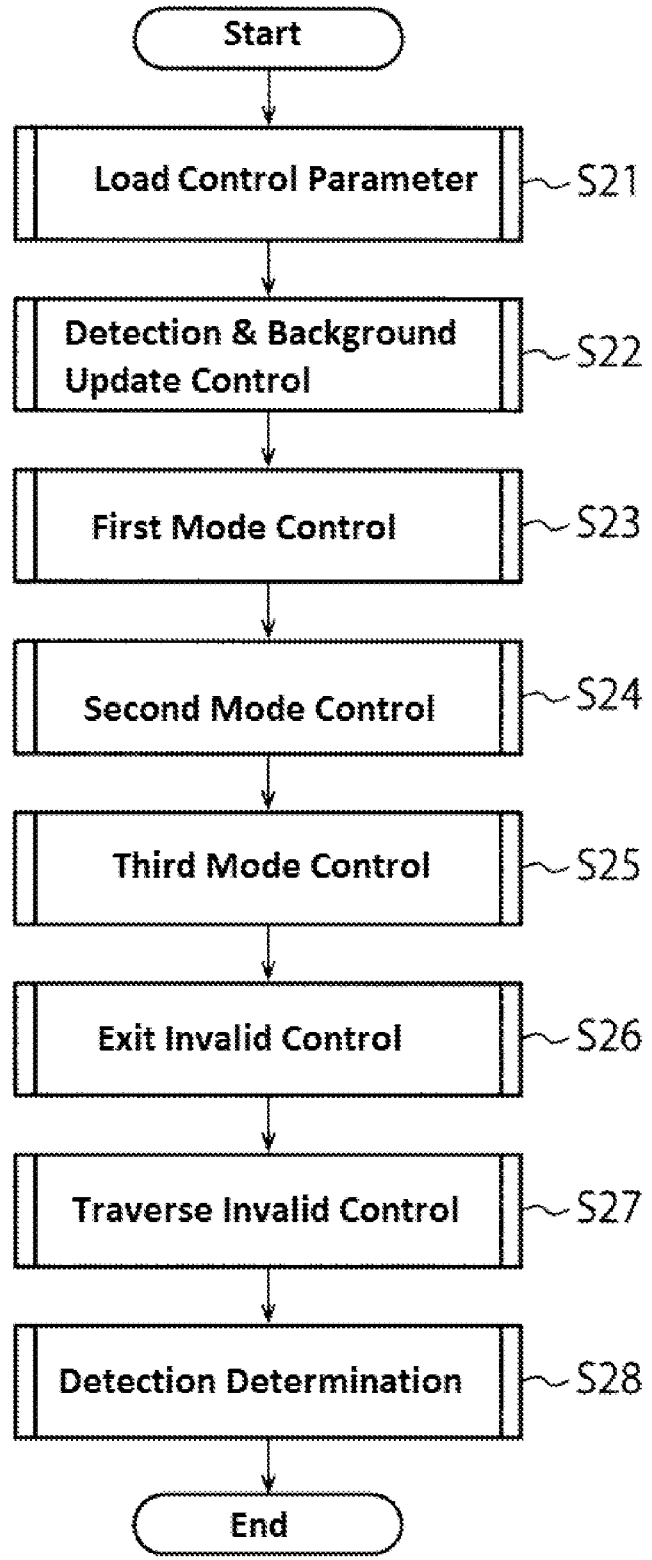
FIG. 17 is a flowchart illustrating an activation detection control in the operation example of the automatic door system according to the embodiment.
Figure 18:
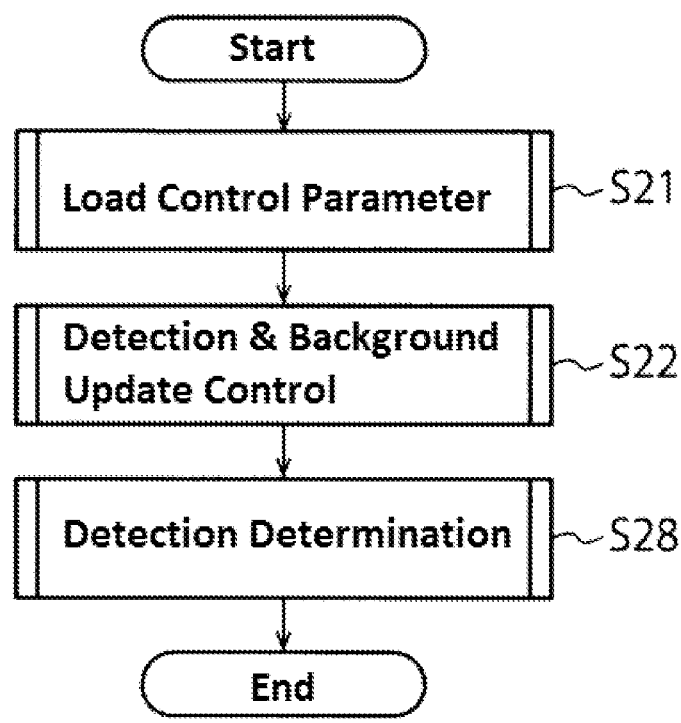
FIG. 18 is a flowchart illustrating a protection detection control in the operation example of the automatic door system according to the embodiment.

FIG. 17 is a flowchart illustrating the activation detection control in the operation example of the automatic door system 1 according to the embodiment. FIG. 18 is a flowchart illustrating the protection detection control in the operation example of the automatic door system 1 according to the embodiment. The processes shown in the flowcharts of FIGS. 17 and 18 may be repeatedly carried out as necessary.

Activation Detection Control: SA2, S2B

Figure 19:
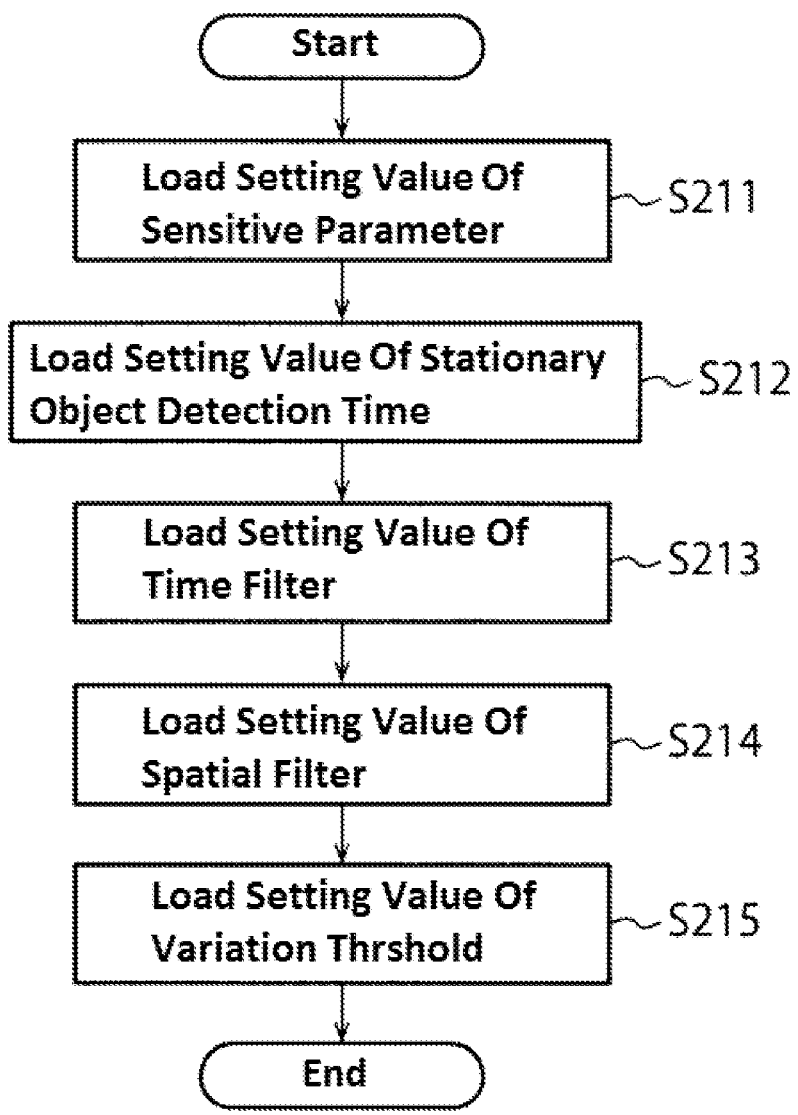
FIG. 19 is a flowchart illustrating loading of control parameters in the operation example of the automatic door system according to the embodiment.

When the activation detection control is executed (step S2A, step S2B), the sensor control unit 32 first loads control parameters described in the activation detection algorithm (step S21) as shown in FIG. 17. FIG. 19 is a flowchart illustrating loading of the control parameters in the operation example of the automatic door system 1 according to the embodiment. The process shown in the flowchart of FIG. 19 may be repeatedly carried out as necessary.

Loading of Control Parameters: S21

In the loading of the control parameters (step S21), as shown in FIG. 19, the sensor control unit 32 first loads a setting value of the sensitivity parameter (step S211). The setting value of the sensitivity parameter in the activation detection algorithm is equal to or less than the setting value of the sensitivity parameter in the protection detection algorithm.

After the setting value of the sensitivity parameter is loaded, the sensor control unit 32 loads a setting value of the stationary object detection time (step S212). The setting value of the stationary object detection time in the activation detection algorithm is shorter than the setting value of the stationary object detection time in the protection detection algorithm.

After the setting value of the stationary object detection time is loaded, the sensor control unit 32 loads a setting value of the time filter (step S213). The setting value of the time filter is a parameter related to presence or absence of the first mode. When the activation detection algorithm has the first mode and the protection detection algorithm does not have the first mode, the setting value of the time filter in the activation detection algorithm is greater than the setting value of the time filter in the protection detection algorithm.

After the setting value of the time filter is loaded, the sensor control unit 32 loads a setting value of the spatial filter (step S214). The setting value of the spatial filter is a parameter related to the presence or absence of the second mode. The setting value of the spatial filter in the activation detection algorithm having the second mode is greater than the setting value of the spatial filter in the protection detection algorithm that does not have the second mode.

After the setting value of the spatial filter is loaded, the sensor control unit 32 loads a setting value of a variation threshold (step S215). The variation threshold is a parameter related to the presence or absence of the third mode, and indicates a threshold of the variation in the amount of light received for determining that a person approaching is detected. When the activation detection algorithm has the third mode and the protection detection algorithm does not have the third mode, the setting value of the variation threshold in the activation detection algorithm is higher than the setting value of the variation threshold in the protection detection algorithm.

Detection and Background Update Control: S22

As shown in FIG. 17, after the control parameters are loaded, the sensor control unit 32 performs the detection control and the background update control (step S22). FIG. 4 referred above is also a flowchart showing the detection and background update controls in the operation example of the automatic door system 1 according to the embodiment. The process shown in the flowchart of FIG. 4 may be repeatedly carried out as necessary.

In the detection control and the background update control, the sensor control unit 32 first calculates the increase-side threshold value and the decrease-side threshold value of the amount of light received based on the stored value of the amount of light received and the sensitivity parameter loaded at step S211 in FIG. 19. The threshold values are determined with reference to the stored value of the amount of light received in order to determine that a person is detected (step S221).

FIG. 5 referred above is an explanatory diagram for describing the detection and background update controls in the operation example of the automatic door system 1 according to the embodiment. The process shown in the flowchart of FIG. 5 may be repeatedly carried out as necessary. FIG. 5 shows the relations between the amount of light received indicated by the sensing signal of the small detection area 51, the stored value of the light received amount, the sensitivity parameter, the increase-side threshold, the decrease-side threshold, and the state of the detection flag. As shown in FIG. 5, the sensitivity parameter indicates how much the amount of light received should be increased or decreased from the stored value of the amount of light received (the reference value) to be determined that an object is detected. The stored value of the amount of light received (the reference value) may be acquired at a predetermined time such as immediately after power-on of the automatic door system 1.

In the example of FIG. 5, the increase-side threshold is obtained by adding the sensitivity parameter to the stored value of the amount of light received. When the sensed amount of light received changes within the stationary object detection time frame, which will be described later, and the sensed amount of light received is equal to or greater than the increase-side threshold, the sensor control unit 32 turns on the detection flag which means that a person the like is detected. In the example of FIG. 5, the decrease-side threshold is obtained by subtracting the sensitivity parameter from the stored value of the amount of light received. When the sensed amount of light received changes within the stationary object detection time frame which will be described later and the sensed amount of light received is equal to or less than the decrease-side threshold, the sensor control unit 32 turns on the detection flag which means that a person the like is detected Whereas when the sensed amount of light received is larger than the decrease-side threshold and smaller than the increase-side threshold, the sensor control unit 32 turns off the detection flag which means that a person or the like is not detected, in other words, a not-detected state. The detection flag is set, for example, in a storage of the door control unit 23.

As shown in FIG. 4, after calculating the increase-side threshold and the decrease-side threshold, the sensor control unit 32 determines whether the amount of light received indicated by the sensing signal is equal to or greater than the increase-side threshold or equal to or less than the decrease-side threshold. (Step S222).

When the amount of light received is not equal to or greater than the increase-side threshold or not equal to or less than the decrease-side threshold (step S222: N), the sensor control unit 32 turns off the detection flag (step S223).

Whereas when the amount of light received is equal to or greater than the increase-side threshold or equal to or less than the decrease-side threshold (step S222: Y), the sensor control unit 32 determines whether the amount of light indicated by the sensing signal remains the same for the stationary object detection time or longer that has been loaded in step S212 in FIG. 19 (step S224).

When the amount of light received has changed within the stationary object detection time (step S224: N), the sensor control unit 32 turns on the detection flag (step S225).

Whereas when there is no change in the amount of light received during the stationary object detection time or longer (step S224: Y), the sensor control unit 32 turns off the detection flag (step S226).

After turning off the detection flag, the sensor control unit 32 updates the stored value of the amount of light received to the current value of the amount of light received (step S227).

First Mode Control: S23

Figure 20:
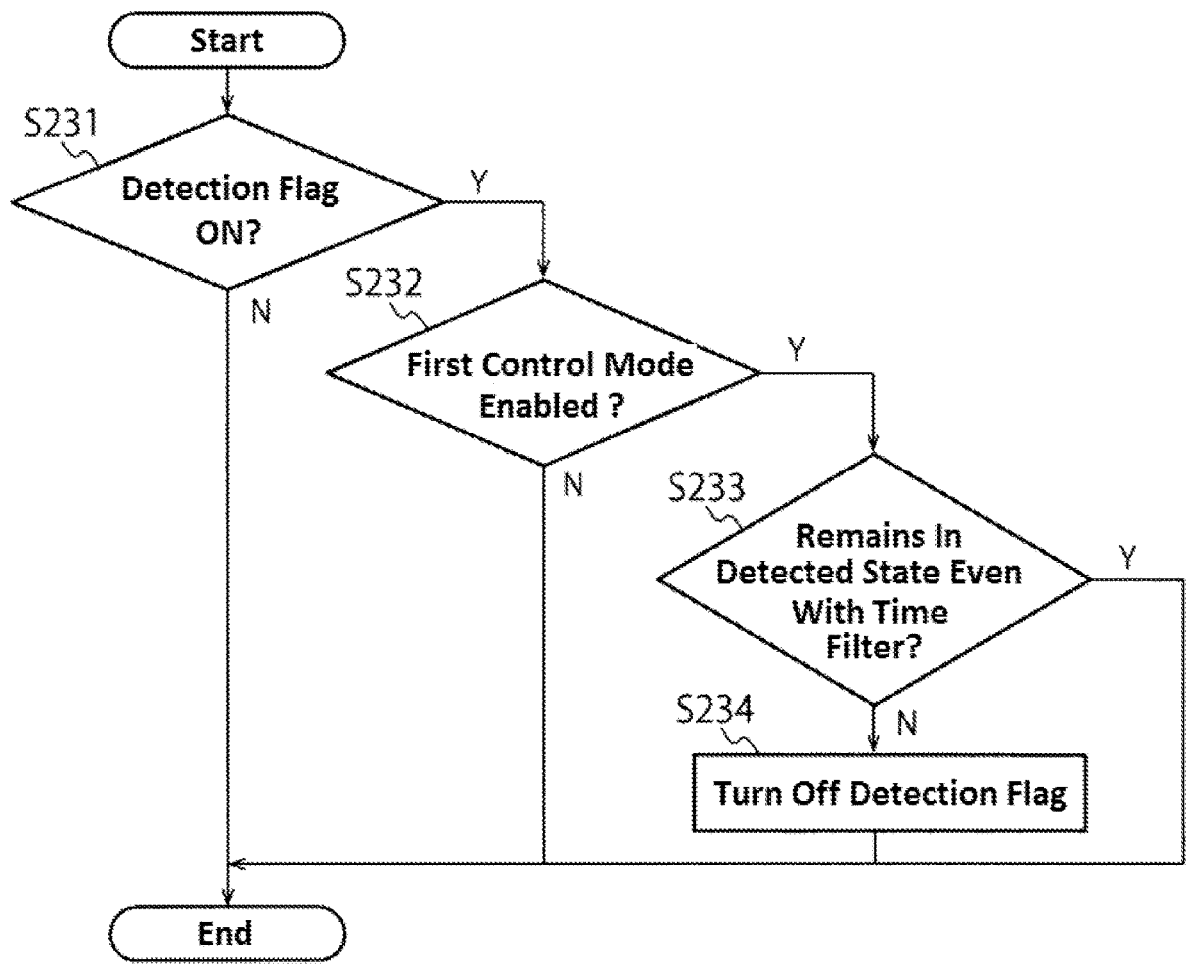
FIG. 20 is a flowchart illustrating a first mode control in the operation example of the automatic door system according to the embodiment.

As shown in FIG. 17, after the detection and background update controls are performed, the sensor control unit 32 performs the first mode control (step S23). FIG. 20 is a flowchart illustrating the first mode control in the operation example of the automatic door system 1 according to the embodiment. The process shown in the flowchart of FIG. 20 may be repeatedly carried out as necessary.

In the first mode control, the sensor control unit 32 first determines whether the detection flag is on (step S231) as shown in FIG. 20.

When the detection flag is not on (step S231: N), the sensor control unit 32 ends the first mode control while the detection flag remains turned off.

Whereas when the detection flag is on (step S231: Y), the sensor control unit 32 determines whether the first mode control setting is enabled or disabled based on, for example, the description of the activation detection algorithm (step S232).

When the first mode control setting is disabled (step S232: N), the sensor control unit 32 ends the first mode control while the detection flag remains turned on.

Whereas when the first mode control setting is enabled (step S232: Y), the sensor control unit 32 determines whether the detection status remains the same even when the time filter is applied to the sensing signal (step S233).

When the detection status is not maintained after the time filter is applied to the sensing signal (step S233: N), the sensor control unit 32 turns off the detection flag (step S234).

Whereas when the detection status remains the same even after the time filter is applied to the sensing signal (step S233: Y), the sensor control unit 32 ends the first mode control while the detection flag is turned on.

Second Mode Control: S24

Figure 21:
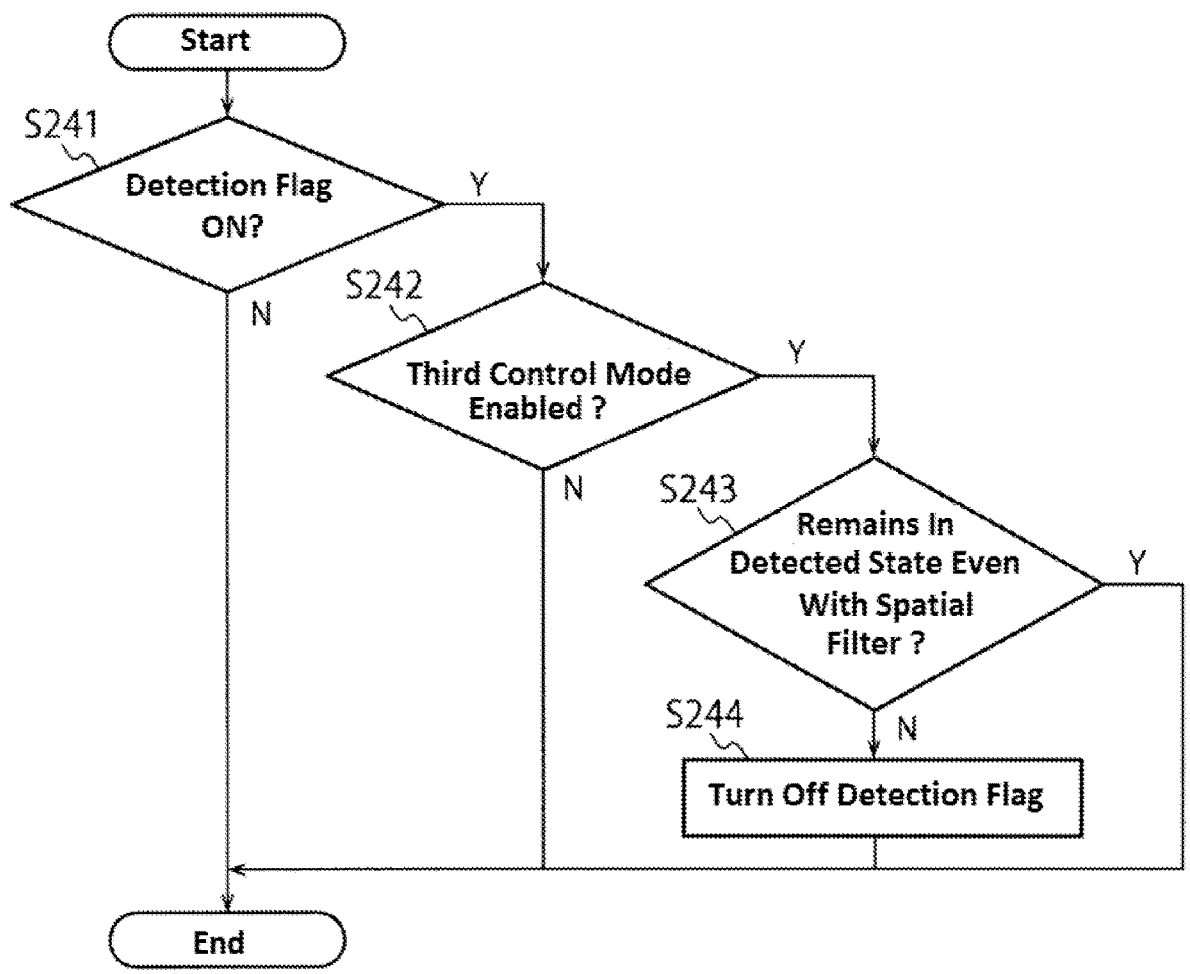
FIG. 21 is a flowchart illustrating a second mode control in the operation example of the automatic door system according to the embodiment.

As shown in FIG. 17, after the first mode control is performed, the sensor control unit 32 performs the second mode control (step S24). FIG. 21 is a flowchart illustrating the second mode control in the operation example of the automatic door system 1 according to the embodiment. The process shown in the flowchart of FIG. 21 may be repeatedly carried out as necessary.

In the second mode control, the sensor control unit 32 first determines whether the detection flag is on (step S241) as shown in FIG. 21.

When the detection flag is not on (step S241: N), the sensor control unit 32 ends the second mode control while the detection flag remains turned off.

Whereas when the detection flag is on (step S241: Y), the sensor control unit 32 determines whether the second mode control setting is enabled or disabled based on, for example, the description of the activation detection algorithm (step S242).

When the second mode control setting is disabled (step S242: N), the sensor control unit 32 ends the second mode control while the detection flag remains turned on.

Whereas when the second mode control setting is enabled (step S242: Y), the sensor control unit 32 determines whether the detection status remains the same even when the spatial filter is applied to the sensing signal (step S243).

When the detection status is not maintained after the spatial filter is applied to the sensing signal (step S243: N), the sensor control unit 32 turns off the detection flag (step S244).

Whereas when the detection status remains the same even after the spatial filter is applied to the sensing signal (step S243: Y), the sensor control unit 32 ends the second mode control while the detection flag is turned on.

Third Mode Control: S25

Figure 22:
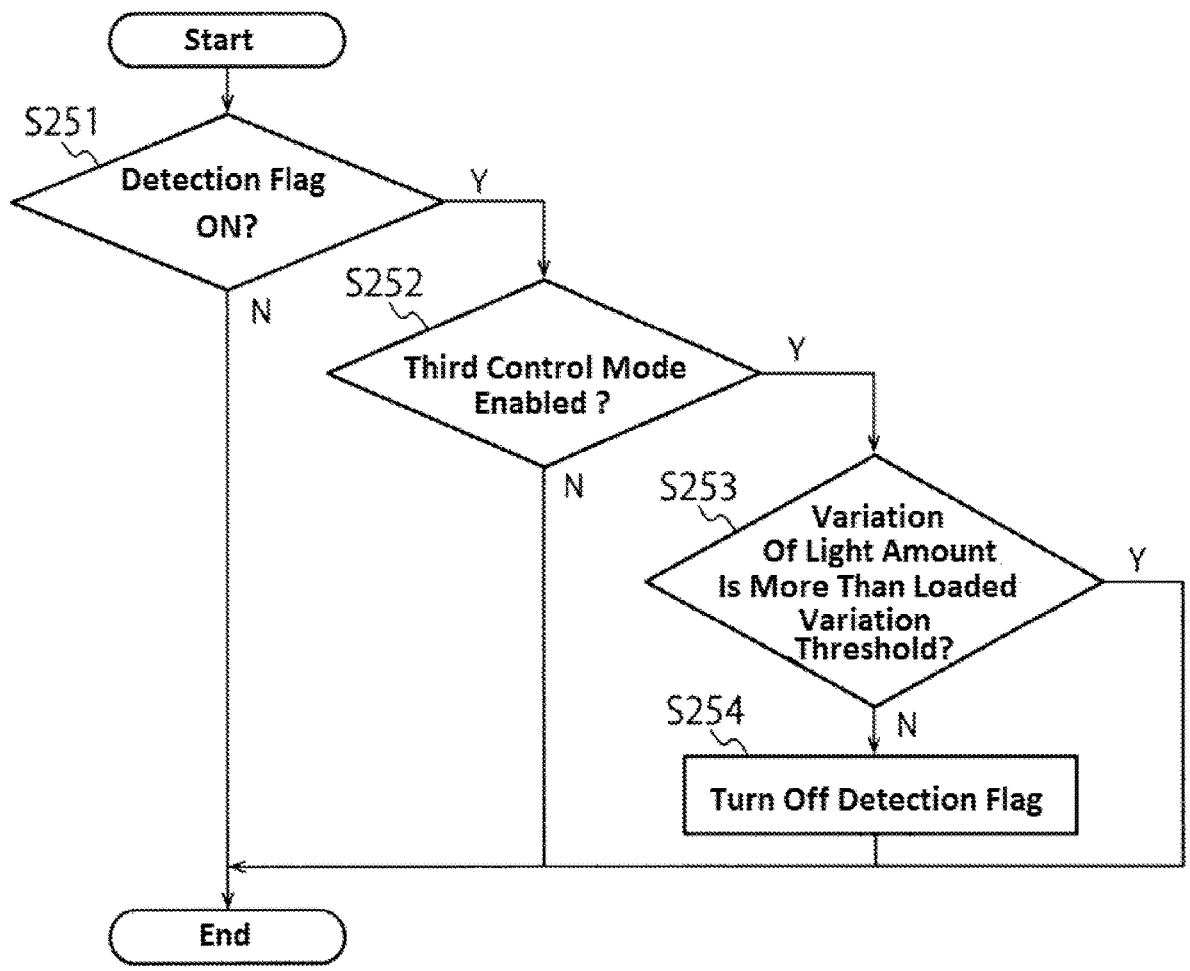
FIG. 22 is a flowchart illustrating a third mode control in the operation example of the automatic door system according to the embodiment.

As shown in FIG. 17, after the second mode control is performed, the sensor control unit 32 performs the third mode control (step S25). FIG. 22 is a flowchart illustrating the third mode control in the operation example of the automatic door system 1 according to the embodiment. The process shown in the flowchart of FIG. 22 may be repeatedly carried out as necessary.

In the third mode control, the sensor control unit 32 first determines whether the detection flag is on (step S251) as shown in FIG. 22.

When the detection flag is not on (step S251: N), the sensor control unit 32 ends the third mode control while the detection flag remains turned off.

Whereas when the detection flag is on (step S251: Y), the sensor control unit 32 determines whether the third mode control setting is enabled or disabled based on, for example, the description of the activation detection algorithm (step S252).

When the third mode control setting is disabled (step S252: N), the sensor control unit 32 ends the third mode control while the detection flag remains turned on.

Whereas when the third mode control setting is enabled (step S252: Y), the sensor control unit 32 determines whether a variation of the amount of received light indicated by the sensing signal is equal to or more than the variation threshold loaded in step S215 of FIG. 19 (step S253).

When the amount of change in the amount of received light indicated by the sensing signal is less than the loaded variation threshold (step S253: N), the sensor control unit 32 turns off the detection flag (step S254).

Whereas when the amount of change in the amount of received light indicated by the sensing signal is equal to or more than the loaded variation threshold (step S253: Y), the sensor control unit 32 end the third mode control while the detection flag is turned off.

Exit Invalid Control: S26

Figure 23:
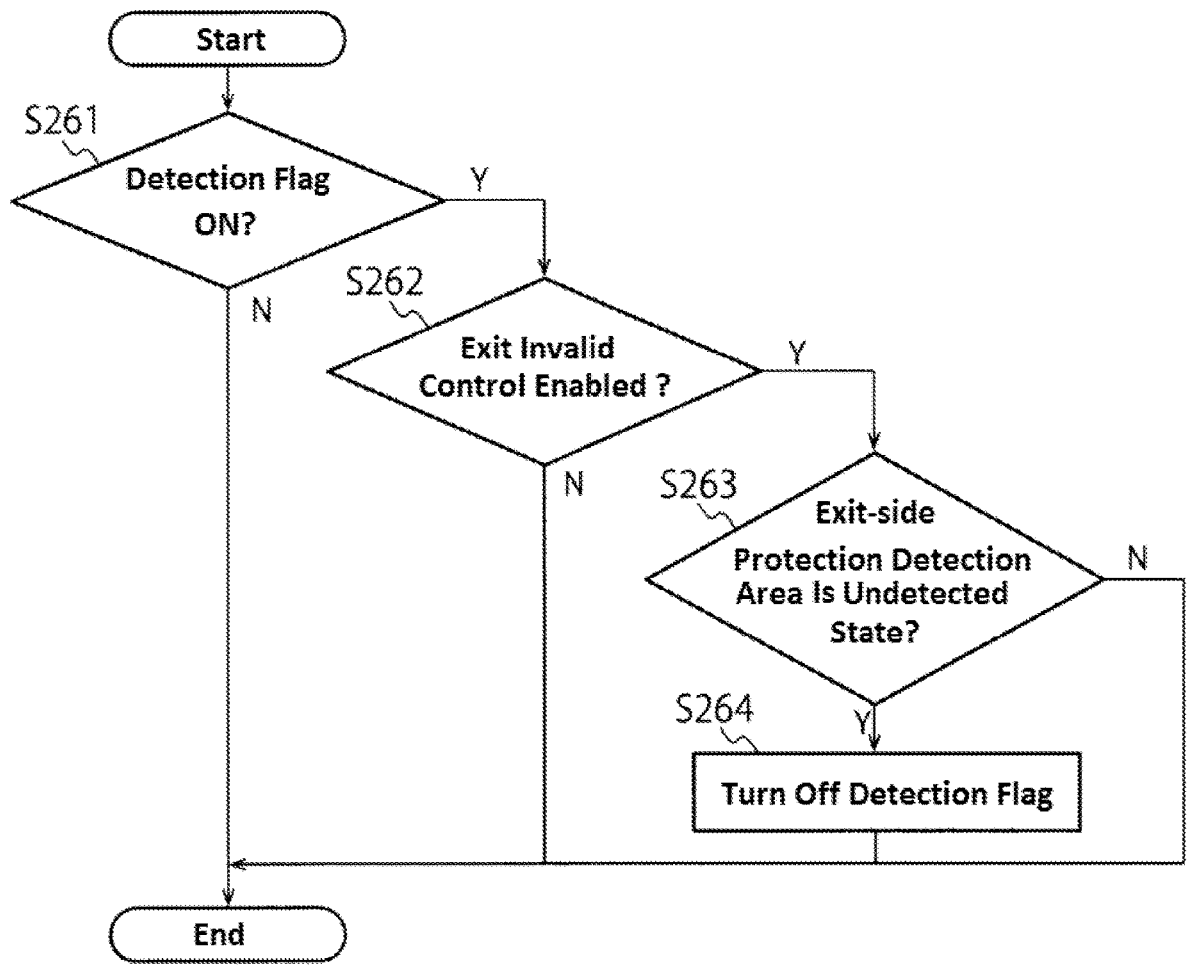
FIG. 23 is a flowchart illustrating an exit invalid control in the operation example of the automatic door system according to the embodiment.

As shown in FIG. 17, after the third mode control is performed, the sensor control unit 32 performs the exit invalid control (step S26). FIG. 23 is a flowchart illustrating the exit invalid control in the operation example of the automatic door system 1 according to the embodiment. The process shown in the flowchart of FIG. 23 may be repeatedly carried out as necessary.

In the exit invalid control, the sensor control unit 32 first determines whether the detection flag is on (step S261) as shown in FIG. 23.

When the detection flag is not on (step S261: N), the sensor control unit 32 ends the exit invalid control while the detection flag remains turned off.

Whereas when the detection flag is on (step S261: Y), the sensor control unit 32 determines whether the exit invalid control setting is enabled or disabled based on, for example, the description of the activation detection algorithm (step S262).

When the exit invalid control setting is disabled (step S262: N), the sensor control unit 32 ends the exit invalid control while the detection flag remains turned on.

Figure 24:
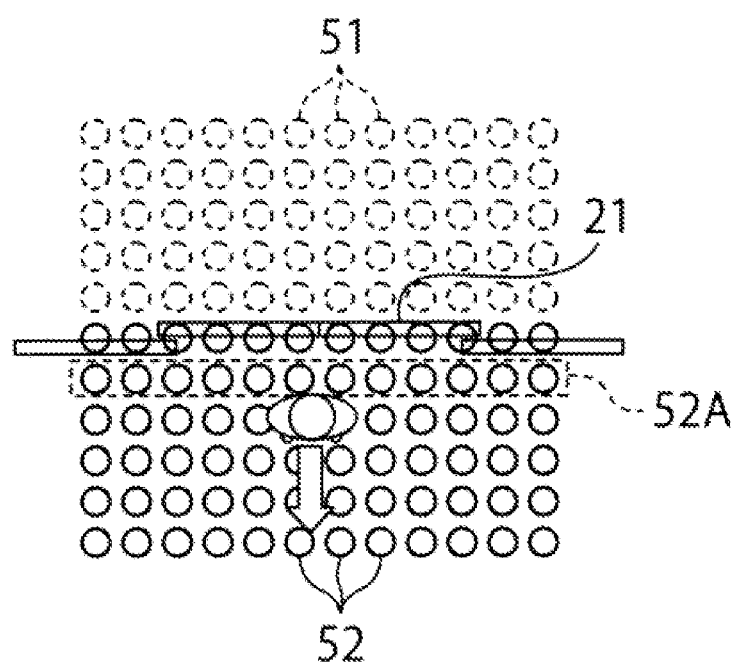
FIG. 24 is an explanatory diagram for describing the exit invalid control in the operation example of the automatic door system according to the embodiment.

FIG. 24 is an explanatory diagram for describing the exit invalid control in the operation example of the automatic door system 1 according to the embodiment. When the exit invalid control setting is enabled (step S262 in FIG. 23: Y), among the small detection areas 52 on the exit side of the door 21, it is determined whether the protection detection area 52A on the exit side is in the undetected state based on the sensing signal from the protection detection area 52A, (step S263) as shown in FIG. 24. FIG. 24 shows a state in which a person moves from the protection detection area 52A on the exit side in the direction away from the door 21 (the direction of arrow in FIG. 24) after the person passed through the opening of the door 21. In the example of FIG. 24, the protection detection area 52A on the exit side is in the undetected state.

When the protection detection area 52A on the exit side is in the undetected state (step S263: Y), the sensor control unit 32 turns off the detection flag (step S264).

Whereas when the protection detection area 52A on the exit side is not in the undetected state (step S263: N), the sensor control unit 32 ends the exit invalid control while the detection flag remains turned on.

Traverse Invalid Control: S27

Figure 25:
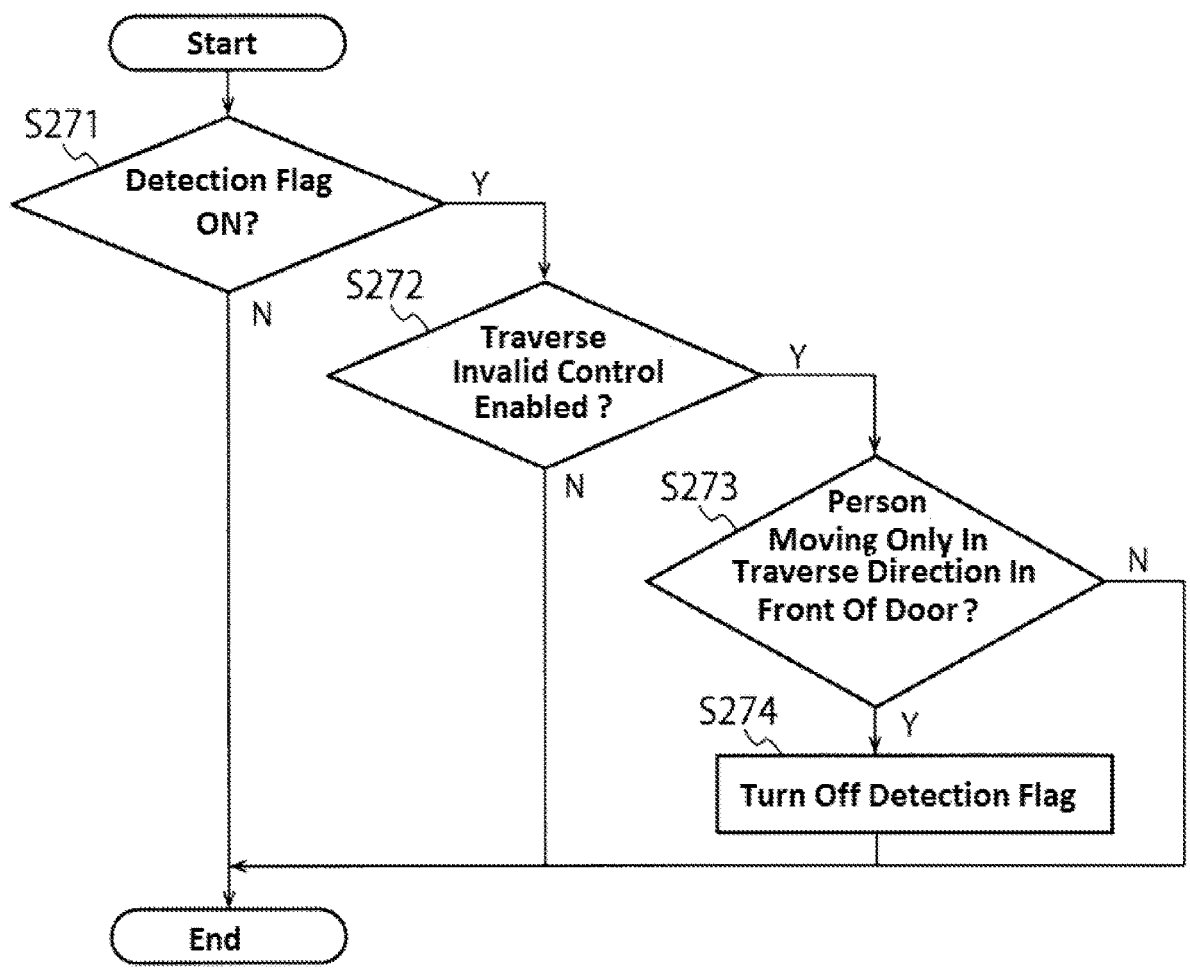
FIG. 25 is a flowchart illustrating a traverse invalid control in the operation example of the automatic door system according to the embodiment.

As shown in FIG. 17, after the exit invalid control is performed, the sensor control unit 32 performs the traverse invalid control (step S27). FIG. 25 is a flowchart illustrating the traverse invalid control in the operation example of the automatic door system 1 according to the embodiment. The process shown in the flowchart of FIG. 25 may be repeatedly carried out as necessary.

In the traverse invalid control, the sensor control unit 32 first determines whether the detection flag is on (step S271) as shown in FIG. 25.

When the detection flag is not on (step S271: N), the sensor control unit 32 ends the traverse invalid control while the detection flag remains turned off.

Whereas when the detection flag is on (step S271: Y), the sensor control unit 32 determines whether the traverse invalid control setting is enabled or disabled based on, for example, the description of the activation detection algorithm (step S272).

When the traverse invalid control setting is disabled (step S272: N), the sensor control unit 32 ends the traverse invalid control while the detection flag remains turned on.

Figure 26:
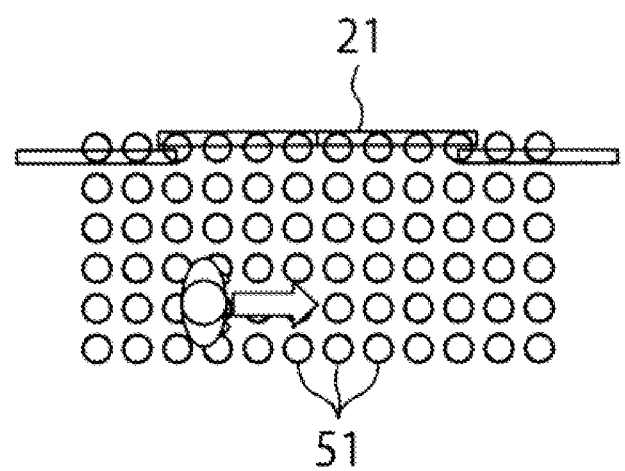
FIG. 26 is an explanatory diagram for describing the traverse invalid control in the operation example of the automatic door system according to the embodiment.

FIG. 26 is an explanatory diagram for describing the traverse invalid control in the operation example of the automatic door system 1 according to the embodiment. When the traverse invalid control is enabled (step S272: Y), the sensor control unit 32 determines whether a person is moving only in the traverse direction in front of the door 21 (in other words, the direction along the door 21) as indicated by the arrow in FIG. 26 based on a movement vector of the person acquired from a change in the small detection areas 51 in the detected state (step S273).

When the person moves only in the traverse direction in front of the door 21 (step S273: Y), the sensor control unit 32 turns off the detection flag (step S274).

Whereas when the person is not moving in the traverse direction in front of the door 21 (step S273: N), the sensor control unit 32 ends the traverse invalid control while the detection flag remains turned on.

Detection Determination: S28

Figure 27:
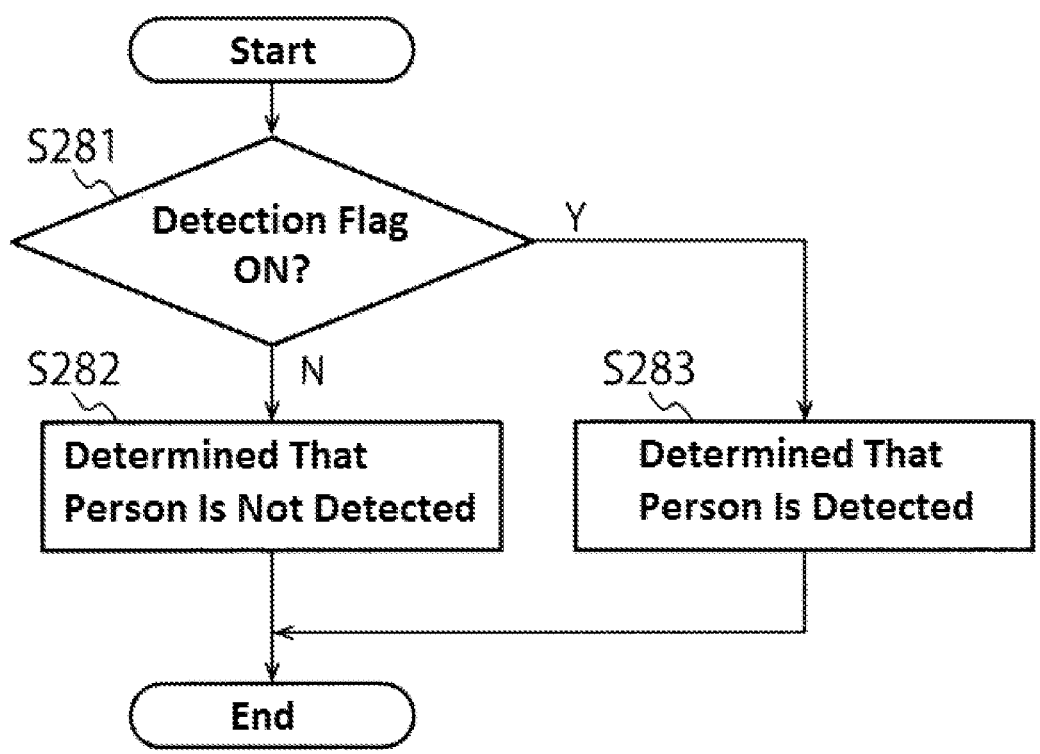
FIG. 27 is a flowchart illustrating a detection determination in the operation example of the automatic door system according to the embodiment.

As shown in FIG. 17, after the traverse invalid control is performed, the sensor control unit 32 performs the detection determination (step S28). FIG. 27 is a flowchart illustrating the detection determination in the operation example of the automatic door system 1 according to the embodiment. The process shown in the flowchart of FIG. 27 may be repeatedly carried out as necessary.

In the detection determination, the sensor control unit 32 first determines whether the detection flag is on (step S281) as shown in FIG. 27.

When the detection flag is not on (step S281: N), the sensor control unit 32 determines that a person approaching is not detected (step S282).

Whereas when the detection flag is on (step S281: Y), the sensor control unit 32 determines that a person approaching is detected (step S283).

As described above, the activation detection control (SA2, S2B) is performed. In the activation detection control, the order of execution of steps S22 to S27 in FIG. 17 may be switched or changed. Also, one or more of the steps may be omitted.

Protection Detection Control: S2C, S2D

When the protection detection control is performed (Step S2C, Step S2D), the sensor control unit 32 performs the steps shown in FIG. 18. Unlike the activation detection control of FIG. 17, the first mode control (step S23), the second mode control (step S24), the third mode control (step S25), the exit invalid control (step S26), and the traverse invalid control (step S27) are not executed in the protection detection control of FIG. 18. However, depending on the relation between the extent of the safety to be secured and the reduction of the unnecessary opening and closing operations, any combination of the first mode control, the second mode control, the third mode control, the exit invalid control, and the traverse invalid control may be performed in the protection detection control. Further, the sensor control unit 32 may select which type of the protection detection algorithm is to be used depending on whether the door state determined in step S1 of FIG. 16 is the fully opened state or in closing motion. That is, the sensor control unit 32 may change the protection detection algorithm used for detection depending on the door position.

According to the above-described embodiment, in the same special detection area 51A, detection in accordance with the activation detection algorithm is performed when the door 21 is in the closed position, and detection in accordance with the protection detection algorithm when the door 21 is in a position other than the closed position. As a result, when the door 21 is in the closed position, it is possible to prevent the unnecessary opening and closing operations of the door 21 caused by erroneous detection in accordance with the protection detection algorithm. Moreover, when the door 21 is a position other than the closed position, it is possible to prevent deterioration of the safety in the vicinity of the door 21 due to failures of detection in accordance with the activation detection algorithm. Therefore, according to the aspects of the embodiment, it is possible to achieve both the reduction of the unnecessary opening and closing operations of the door and the improvement of the safety.

First Modification Example

Figure 28:
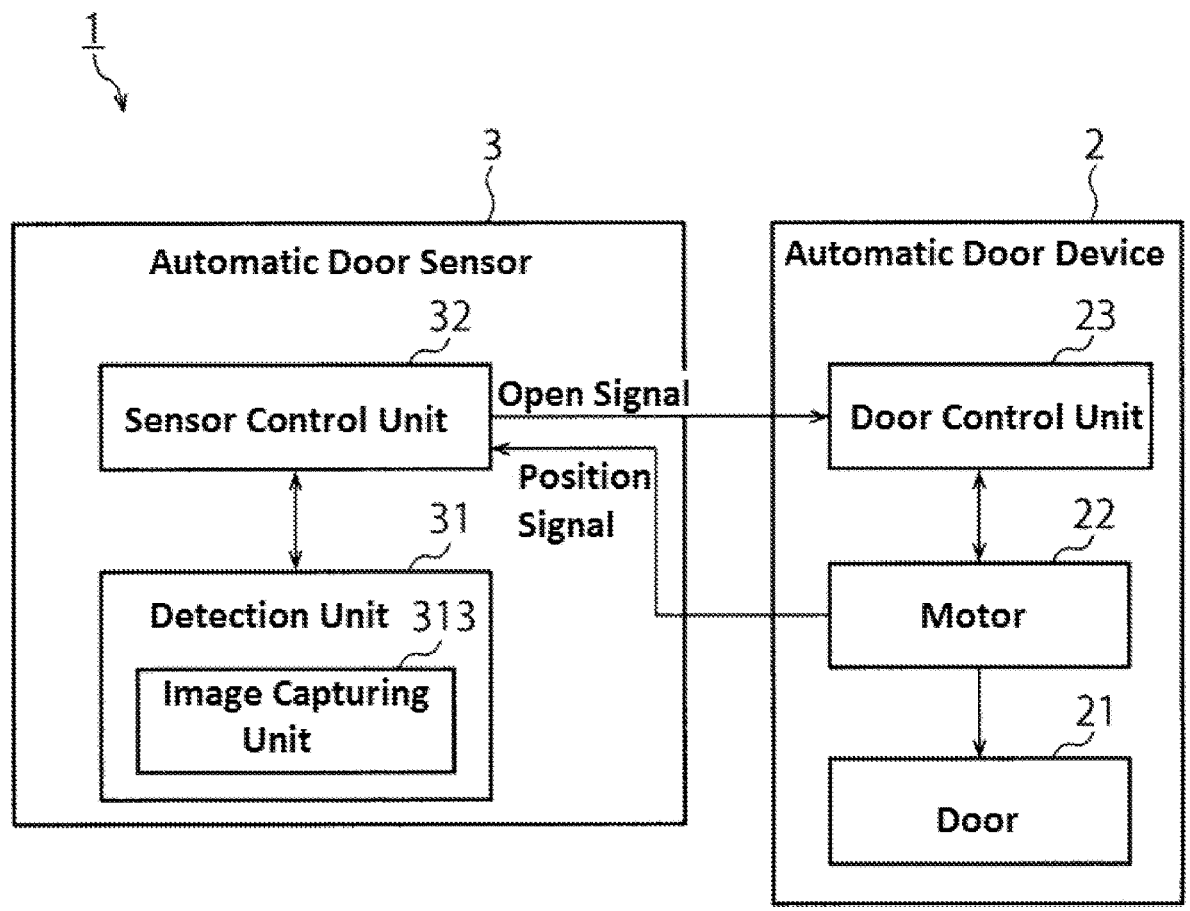
FIG. 28 is a block diagram illustrating an automatic door system according to a first modification example.

A description is given of a first modification example in which detection based on a captured image is performed. FIG. 28 is a block diagram illustrating the automatic door system 1 according to the first modification example of the embodiment. As shown in FIG. 28, the automatic door sensor 3 of the first modification example includes the image capturing unit 313 as an example of the detection unit instead of the emitter 311 and the receiver 312. The image capturing unit 313 is, for example, a CCD or CMOS camera having sensitivity in the visible light range. The image capturing unit 313 may be an infrared camera having sensitivity in the infrared range.

The image capturing unit 313 captures an image of the detection area 5, and outputs a sensing signal indicating the captured image of the detection area 5 to the sensor control unit 32. The sensor control unit 32 detects a person approaching or the like based on the sensing signal supplied from the image capturing unit 313, and supplies the open signal to the automatic door control 23 in response to the detection of the person. Alternatively, it is also possible in the first modification that the door control unit 23 performs the detection of a person.

Also in the first modification example, for the same special detection area 51A, the sensor control unit 32 uses a result of detection in accordance with the activation detection algorithm for the drive control of the door 21 when the door 21 is in the closed position, and switches from the result of the detection in accordance with the protection detection algorithm to a result of detection in accordance with the activation detection algorithm for the drive control of the door 21 when the door 21 is in a position other than the closed position. In this way, it is possible to achieve both the reduction of the unnecessary opening and closing operations of the door and the improvement of the safety. In addition, since a person approaching and the like can be detected with high accuracy based on a captured image in the first modification example, it is possible to achieve both the reduction of the unnecessary opening and closing operations of the door and the improvement of the safety.

Second Modification Example

Figure 29:
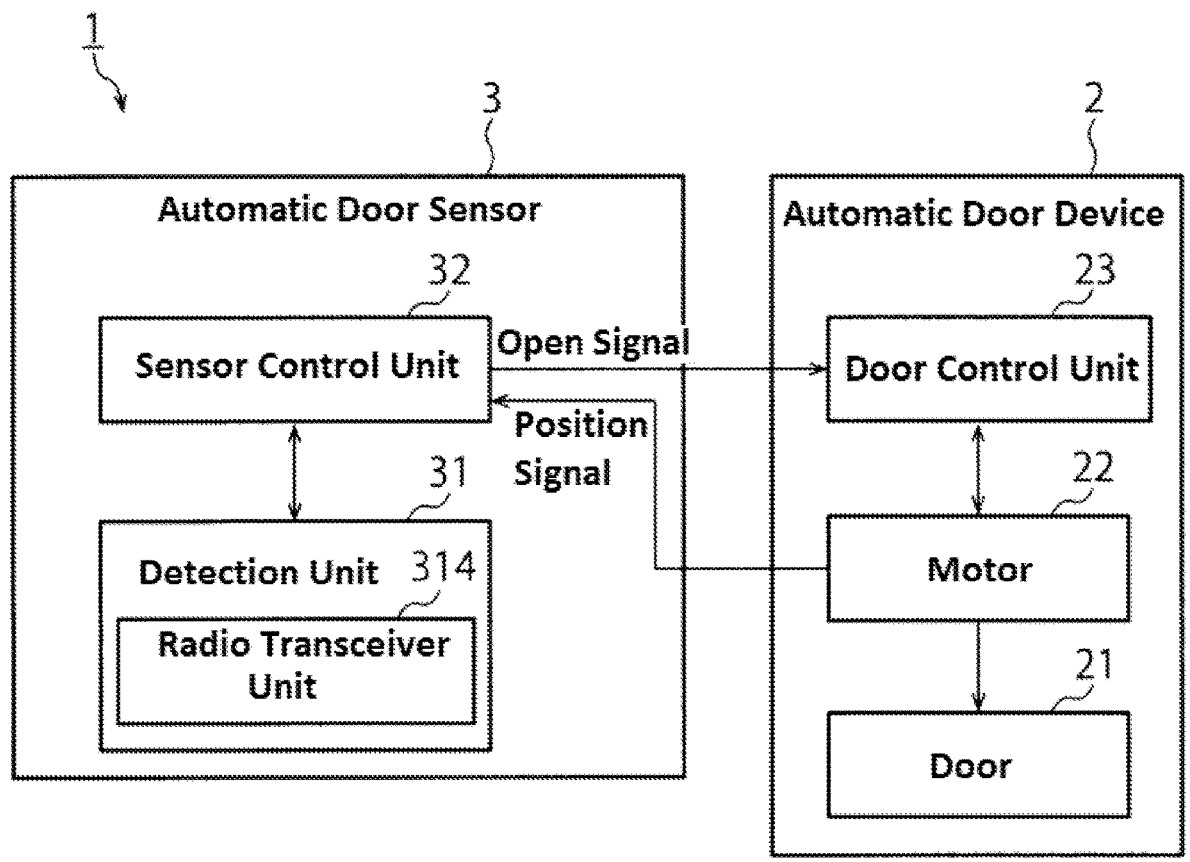
FIG. 29 is a block diagram illustrating an automatic door system according to a second modification example.

A description is given of a second modification example in which detection based on the Doppler effect of a radio wave is performed. FIG. 29 is a block diagram illustrating the automatic door system 1 according to the second modification example of the embodiment. As shown in FIG. 29, the automatic door sensor 3 of the second modification example includes the radio transceiver unit 314 as an example of the detection unit. The radio transceiver unit 314 transmits a radio wave to the detection area 5 and detects an interference wave between a transmitted radio wave and a reflected wave reflected by a person approaching or the like in the detection area 5. The radio transceiver unit 34 then supplies a sensing signal that indicates the interference wave to the sensor control unit 32. The sensor control unit 32 detects a person approaching based on the sensing signal supplied from the radio transceiver unit 34, and supplies the open signal to the automatic door control 23 in response to the detection of the person and the like. Alternatively, it is also possible in the second modification that the door control unit 23 performs the detection of a person.

Also in the second modification example, for the same special detection area 51A, the sensor control unit 32 uses a result of detection in accordance with the activation detection algorithm for the drive control of the door 21 when the door 21 is in the closed position, and switches from the result of the detection in accordance with the protection detection algorithm to a result of detection in accordance with the activation detection algorithm for the drive control of the door 21 when the door 21 is in a position other than the closed position. In this way, it is possible to achieve both the reduction of the unnecessary opening and closing operations of the door and the improvement of the safety.

The automatic door sensor 3 may use an ultrasonic wave or a distance measurement sensor instead of the infrared light, the image and the radio wave described above.

Third Modification Example

Figure 30:
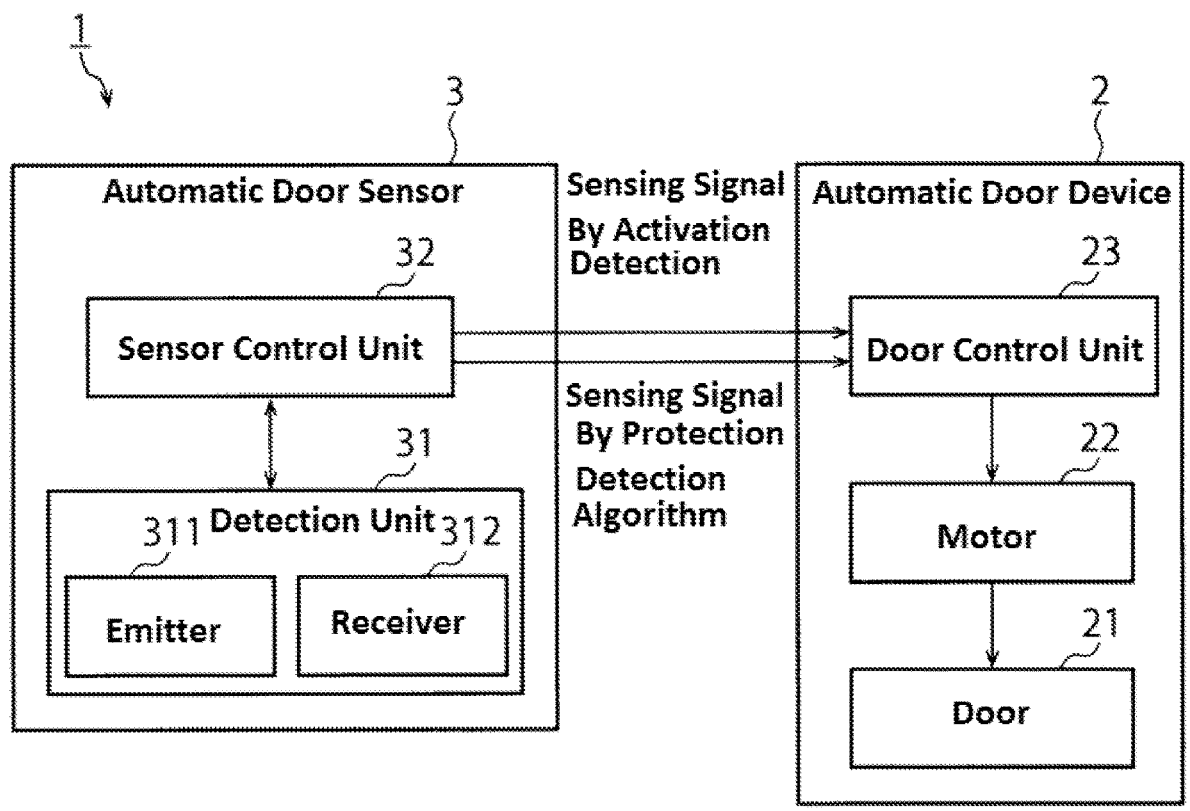
FIG. 30 is a block diagram illustrating an automatic door system according to a third modification example.

Next, a third modification example will now be described. FIG. 30 is a block diagram illustrating the automatic door system 1 according to the third modification example of the embodiment. As shown in FIG. 30, the automatic door sensor 3 of the third modified example supplies, to the door control unit 23, a result of detection in accordance with the activation detection algorithm and a result of detection in accordance the protection detection algorithm as sensing signals. The door control unit 23 that has received the two types of sensing signal determines which detection result is used for the control or neither of the detection results is not used depending on the position of the door 21 and other conditions. For example, when it is determined that a person or an object does not exist from the result of detection in accordance with the activation detection algorithm but it is determined that a person exists from the result of detection in accordance with the protection detection algorithm, the door 21 can be closed at a lower speed than normal.

Also in the third modification example, for the same special detection area 51A, the door control unit 32 uses a result of detection in accordance with the activation detection algorithm for the drive control of the door 21 when the door 21 is in the closed position, and switches from the result of the detection in accordance with the protection detection algorithm to a result of detection in accordance with the activation detection algorithm for the drive control of the door 21 when the door 21 is in a position other than the closed position. In this way, it is possible to achieve both the reduction of the unnecessary opening and closing operations of the door and the improvement of the safety.

Aspects of the invention are not limited to the individual embodiments described above. For example, instead of using the activation detection algorithm and the protection detection algorithm, an activation sensor and a protection sensor that are physically separate but have overlapping detection areas may be used. In this case, the activation sensor has a person or object detection function equivalent to the activation detection algorithm, and, the protection sensor has a person or object detection function equivalent to the protection detection algorithm.

Aspects of the present invention are not limited to the foregoing individual embodiments and embrace various modifications conceivable by those skilled in the art. Advantageous effects of the present invention are also not limited to those described above. That is, various additions, changes, and partial deletions are possible in a range of not departing from the conceptual ideas and spirit of the present invention derived from contents defined in the claims and equivalents thereof.

What is claimed is:

1. An automatic door sensor, comprising:
a detector comprising an emitter and a receiver, the detector configured to output a signal based on an amount of light that is emitted from the emitter to a detection area and is received by the receiver, and
a sensor controller configured to detect a person or an object based on the signal output from the detector,
wherein the sensor controller comprises an activation detection processing unit for detecting the person or object approaching and opening a door and a protection detection processing unit for detecting the person or object in the vicinity of the door,
the activation detection processing unit having a lower detection sensitivity reference range for the person or object than the protection detection processing unit, the activation detection processing unit configured to receive and process the signal output from the detector and detect the person or object with the lower detection sensitivity reference range than the protection detection processing unit, and
the protection detection processing unit having a higher detection sensitivity reference range for the person or object than the activation detection processing unit, the protection detection processing unit configured to receive and process the signal output from the detector and detect the person or object with the higher detection sensitivity reference range than the activation detection processing unit,
wherein the detection area has a special detection area in which detections for the same special detection area are performed by both the activation detection processing unit and the protection detection processing unit, and
wherein the sensor controller is configured to output results of the detections by the activation detection processing unit and the protection detection processing unit in the same special detection area individually.

2. The automatic door sensor of claim 1, wherein the detection area further has an activation detection area in which detection is performed only by the activation detection processing unit, and
wherein the special detection area is disposed closer to the door than the activation detection area.

3. The automatic door sensor of claim 1, wherein the sensor controller further comprises a doorway detection processing unit configured to detect the person or object on a track of the door,
wherein the detection area has a second special detection area in which detections by the doorway detection processing unit and the protection detection processing unit are performed, and
wherein the sensor controller is configured to output results of the detections by the doorway detection processing unit and the protection detection processing unit either individually or collectively.

4. The automatic door sensor of claim 3, wherein the sensor controller is configured to perform the detection by the protection detection processing unit in the second special detection area only when the door is in a fully-opened position.

5. The automatic door sensor of claim 1, wherein the sensor controller further comprises a fixed-wall side detection processing unit configured to detect the person or object in the vicinity of a fixed wall of the door,
wherein the detection area has a third special detection area in which detections by the fixed-wall side detection processing unit and the protection detection processing unit are performed, and
wherein the sensor controller configured to output results of the detections by the fixed-wall side detection processing unit and the protection detection processing unit either individually or collectively.

6. The automatic door sensor of claim 1, wherein the activation detection processing unit includes an activation stationary object detection time defined as a time from when the person or object is detected by the activation detection processing unit to when the detected person or object is determined by the activation detection processing unit as a stationary object and excluded from a detection target,
wherein the protection detection processing unit includes a protection stationary object detection time defined as a time from when the person or object is detected by the protection detection processing unit to when the detected person or object is determined by the protection detection processing unit as a stationary object and excluded from a detection target, and
wherein the protection stationary object detection time is longer than the activation stationary object detection time.

7. An automatic door system, comprising:
a detector comprising an emitter and a receiver, the detector configured to output a signal based on an amount of light that is emitted from the emitter to a detection area and is received by the receiver, and
a sensor controller configured to detect a person or an object based on the signal output from the detector, and
a door controller open/close configured to control a door based on a result of detection of the person or object,
wherein the sensor controller or the door controller comprises an activation detection processing unit for detecting the person or object approaching and opening the door, and a protection detection processing unit for detecting the person or object in the vicinity of the door,
the activation detection processing unit having a lower detection sensitivity reference range for the person or object than the protection detection processing unit, the activation detection processing unit configured to receive and process the signal output from the detector and detect the person or object with the lower detection sensitivity reference range than the protection detection processing unit, and
the protection detection processing unit having a higher detection sensitivity reference range for the person or object than the activation detection processing unit, the protection detection processing unit configured to receive and process the signal output from the detector and detect the person or object with the higher detection sensitivity reference range than the activation detection processing unit,
wherein the detection area has a special detection area in which detections for the same special detection area are performed by both the activation detection processing unit and the protection detection processing unit, and
wherein, in a special detection area, the sensor controller or the door controller is configured to use a result of detection by the activation detection processing unit for drive control of the door when the door is in a closed position, and use a result of detection by the protection detection processing unit for the drive control of the door when the door is in a position other than the closed position.

8. The automatic door system of claim 7, wherein the detection area further includes an activation detection area in which detection only by the activation detection processing unit is performed, and wherein the special detection area is disposed closer to the door than the activation detection area.

9. The automatic door system of claim 7, wherein the sensor controller or the door controller further comprises a doorway detection processing unit configured to detect the person or object on a track of the door, wherein the detection area includes a second special detection area in which detections by the doorway detection processing unit and the protection detection processing unit are performed, and wherein, in the second special detection area, the sensor controller or the door controller is configured to use a result of detection by the protection detection processing unit for drive control of the door when the door is in a fully opened position, and use a result of detection by the doorway detection processing unit for the drive control of the door when the door is in a position other than the fully-opened position.

10. The automatic door system of claim 7, wherein the sensor controller or the door controller further comprises a fixed-wall side detection processing unit configured to detect the person or object in the vicinity of a fixed wall of the door, wherein the detection area includes a third special detection area in which detections by the fixed-wall side detection processing unit and the protection detection processing unit are performed, wherein, in the third special detection area, the sensor controller or the door controller is configured to use a result of detection by the fixed-wall side detection processing unit for drive control of the door when the door is moving to a fully-opened position, and use a result of detection by the protection detection processing unit for the drive control of the door except when the door is moving to the fully-opened position.

11. The automatic door system of claim 7, wherein the activation detection processing unit includes an activation stationary object detection time defined as a time from when the person or object is detected by the activation detection processing unit to when the detected person or object is determined by the activation detection processing unit as a stationary object and excluded from a detection target, wherein the protection detection processing unit includes a protection stationary object detection time defined as a time from when the person or object is detected by the protection detection processing unit to when the detected person or object is determined by the protection detection processing unit as a stationary object and excluded from a detection target, and wherein the protection stationary object detection time is longer than the activation stationary object detection time.

12. A method of controlling an automatic door system, comprising:

performing, in a special detection area that is a part of a detection area for detecting a person or an object, detection by an activation detection processing unit that detects the person or object is performed when a door is in a closed position, and using a result of the detection for drive control of the door, the activation detection processing unit being provided in a sensor controller or a door controller, the sensor controller configured to detect the person or object based on a signal output from a detector that comprises an emitter and a receiver, the detector configured to output the signal based on an amount of light that is emitted from the emitter to the detection area and is received by the receiver, the door controller open/close configured to control the door based on a result of the detection of the person or object; and performing, in the special detection area, detection by a protection detection processing unit that has a higher detection sensitivity reference range for the person or object than the activation detection processing unit when the door is in a position other than the closed position, and using a result of the detection for the drive control of the door, the protection detection processing unit being provided in the sensor controller or the door controller, wherein the activation detection processing unit includes a lower detection sensitivity reference range for the person or object than the protection detection processing unit, wherein the activation detection processing unit is configured to receive and process the signal output from the detector and detect the person or object with the lower detection sensitivity reference range than the protection detection processing unit, and wherein the protection detection processing unit is configured to receive and process the signal output from the detector and detect the person or object with the higher detection sensitivity reference range than the activation detection processing unit.

* * * * *